United States Patent
Plona et al.

(10) Patent No.: US 7,643,374 B2
(45) Date of Patent: Jan. 5, 2010

(54) SLOWNESS-FREQUENCY PROJECTION DISPLAY AND ANIMATION

(75) Inventors: Thomas J. Plona, New Milford, CT (US); Shu-Kong Chang, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/011,158

(22) Filed: Jan. 24, 2008

(65) Prior Publication Data

US 2008/0144439 A1 Jun. 19, 2008

Related U.S. Application Data

(63) Continuation-in-part of application No. 10/789,210, filed on Feb. 27, 2004.

(51) Int. Cl.
*G01V 1/00* (2006.01)
(52) U.S. Cl. .................................................. 367/68
(58) Field of Classification Search .............. 367/25, 367/31–33, 68–72; 702/16
See application file for complete search history.

(56) References Cited

U.S. PATENT DOCUMENTS

| | | | |
|---|---|---|---|
| 4,594,691 A | 6/1986 | Kimball et al. | |
| 4,698,792 A | 10/1987 | Kurkjian et al. | |
| 5,077,697 A | 12/1991 | Chang | |
| 5,278,805 A * | 1/1994 | Kimball | 367/32 |
| 5,661,696 A | 8/1997 | Kimball | |
| 6,526,354 B2 | 2/2003 | Bose et al. | |
| 6,614,716 B2 * | 9/2003 | Plona et al. | 367/31 |
| 6,708,118 B2 * | 3/2004 | Stark | 702/16 |
| 6,718,266 B1 | 4/2004 | Sinha et al. | |
| 6,766,252 B2 * | 7/2004 | Blanch et al. | 702/6 |
| 6,845,325 B2 | 1/2005 | Valero et al. | |
| 6,920,082 B2 | 7/2005 | Tang | |
| 2002/0116128 A1 | 8/2002 | Sinha et al. | |
| 2002/0183930 A1 | 12/2002 | Plona et al. | |
| 2003/0167835 A1 | 9/2003 | Sinha et al. | |
| 2005/0190651 A1 * | 9/2005 | Plona et al. | 367/68 |

OTHER PUBLICATIONS

T.J. Plona, M.R. Kane, B. Sinha, J. Walsh, "Evaluating Stress-Induced Anisotropy and Mechanical Damage From Cross-Dipole Sonic Data Using Dispersion Analysis", SPE/ISRM.

Kimball, C.V., and Marzetta, T.L., 1986, "Semblance processing of borehole acoustic array data", Geophysics, 49, No. 3, pp. 274-281.

Lang, S.W., Kurkjian, A.L., McClellan, J.H., Morris, C.F., and Parks, T.W., "Estimating slowness dispersion from arrays of sonic logging waveforms", Geophysics, 52, pp. 530-544.

(Continued)

*Primary Examiner*—Eric Bolda
*Assistant Examiner*—Krystine Saito
(74) *Attorney, Agent, or Firm*—Matthias Abrell; Jaime Castano; Dale Gaudier

(57) ABSTRACT

Techniques for displaying sonic logging data that provide highly reliable, visual quality-control (QC) indicators. One aspect herein is directed to a display of sonic logging data corresponding to a slowness frequency analysis (SFA) projection log.

23 Claims, 27 Drawing Sheets
(22 of 27 Drawing Sheet(s) Filed in Color)

OTHER PUBLICATIONS

Sinha, B.K., Norris, A.N., and Chang, S.K., "Borehole flexural modes in anisotropic formations", Geophysics, 59, pp. 1037-1052.

Brie, A., Kimball, C.V., Pabon, J., and Saiki, Y., 1997, "Shear slowness determination from dipole measurements", 38th SPWLA Ann. Inter. Symp.

Endo, T., Pistre, V., Brie, A., 1999, "Optimum Slowness Evaluation from Sonic Waveform Data", 5th Well Logging Symp. of Japan.

Plona, T., Sinha, B., Kane, M., Shenoy, R., Bose, S., Walsh, J., Ikegami, T., Endo, T., Skelton, O., "Mechanical Damage Detection and Anisotropy Evaluation using Dipole Sonic Dispersion Analysis", 2002, 43th SPWLA Ann. Inter. Symp., Paper KK.

Lu, C.C. and Liu, Q.H., 1995, "A three-dimensional dyadic Green's function for elastic waves in multiplayer cylindrical structures," J. Acoust. Soc. Am., v.98, pp. 2825-2835.

Sinha, B.K., Asvadurov, S., 1998, "Higher-order modes in a fluid-filled borehole", 1998, IEEE Intl. Ultrasonics Symp. Proc., v. 2, pp. 1115-1120.

Sinha, B., Kostek, S., Plona, T.J., Chang, S.K., 1992, "Axisymmetric wave propagation in fluid-loaded cylindrical shells", Part I, J. Acoust. Soc. Am., 92, pp. 1132-1143.

C.V. Kimball, "Shear slowness measurement by dispersive processing of the borehole flexural mode", Geophys. vol. 63, No. 2, pp. 337-344.

B.K. Sinha, S. Zeroug, "Applications of Sonics and Ultrasonics in Geophysical Prospecting", pp. 521-532.

Park, et al., "Multimodal analysis of high frequency surface waves", Prodeedings of the symposium on the application of geophysics to engineering and environmental problems, 1999.

S. Chopra, et al., "Successful AVO and Cross-plotting", CSEG Recorder, XX, XX, Nov. 1, 2003, pp. 5-11.

* cited by examiner

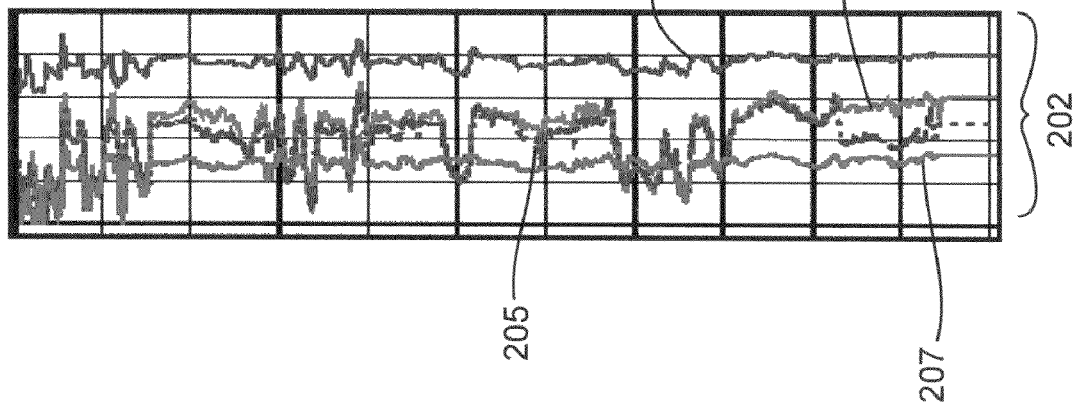
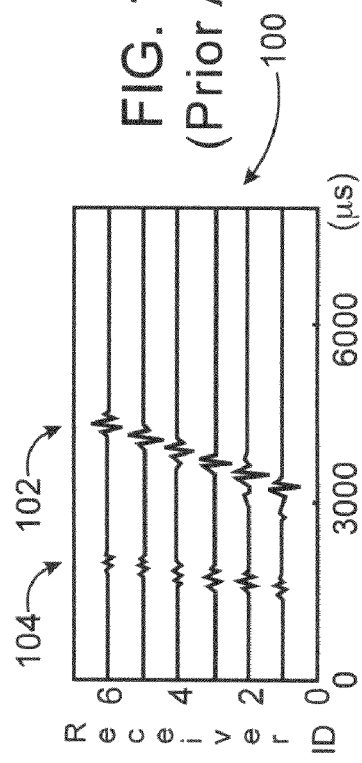
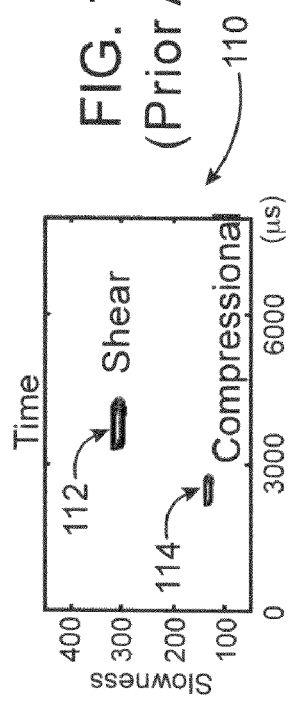

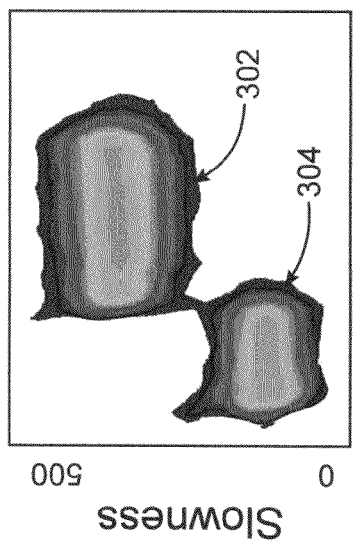
FIG. 3A (PRIOR ART)
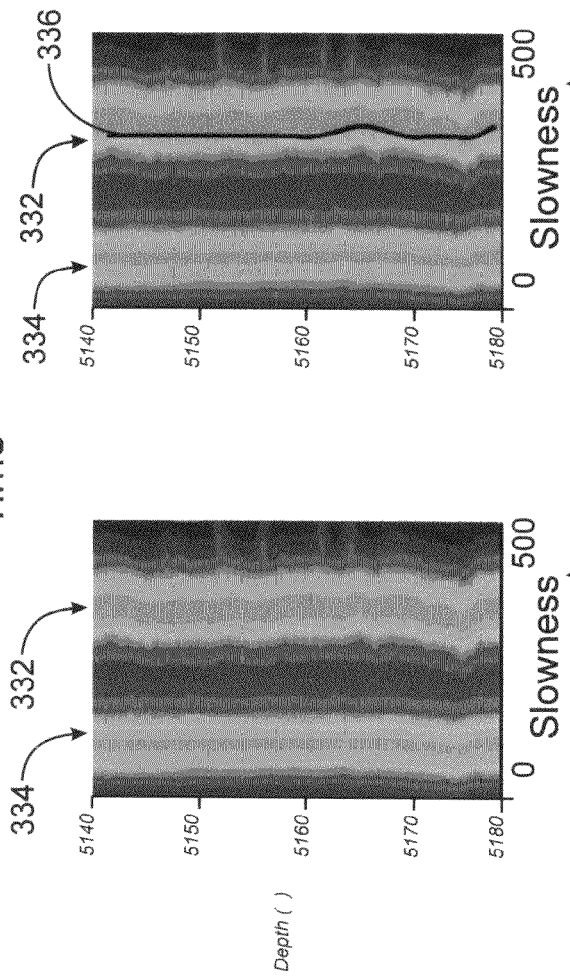
FIG. 3D (PRIOR ART)
FIG. 3E (PRIOR ART)
FIG. 3B (PRIOR ART)
FIG. 3C (PRIOR ART)

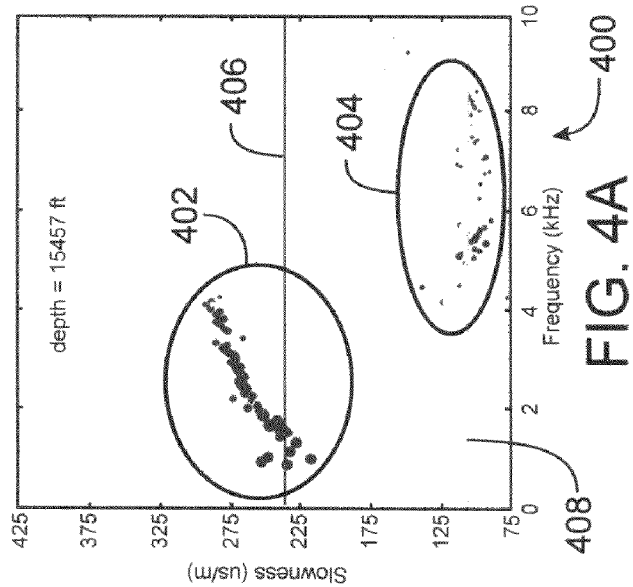
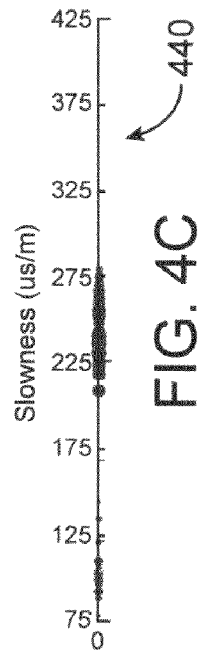
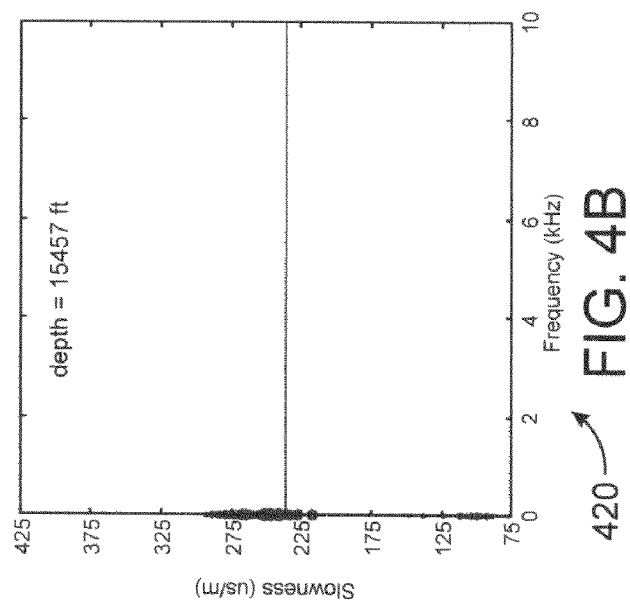

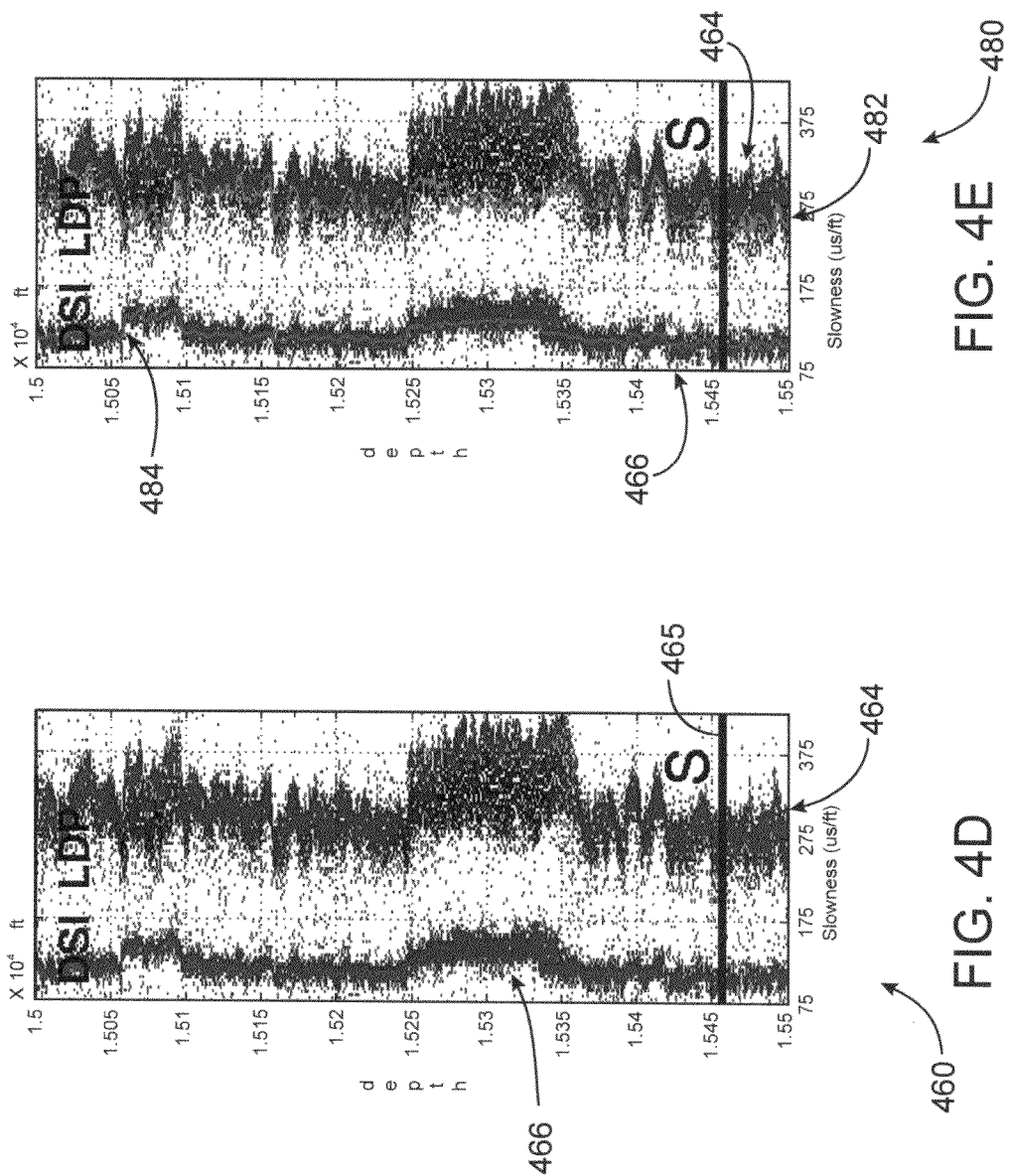

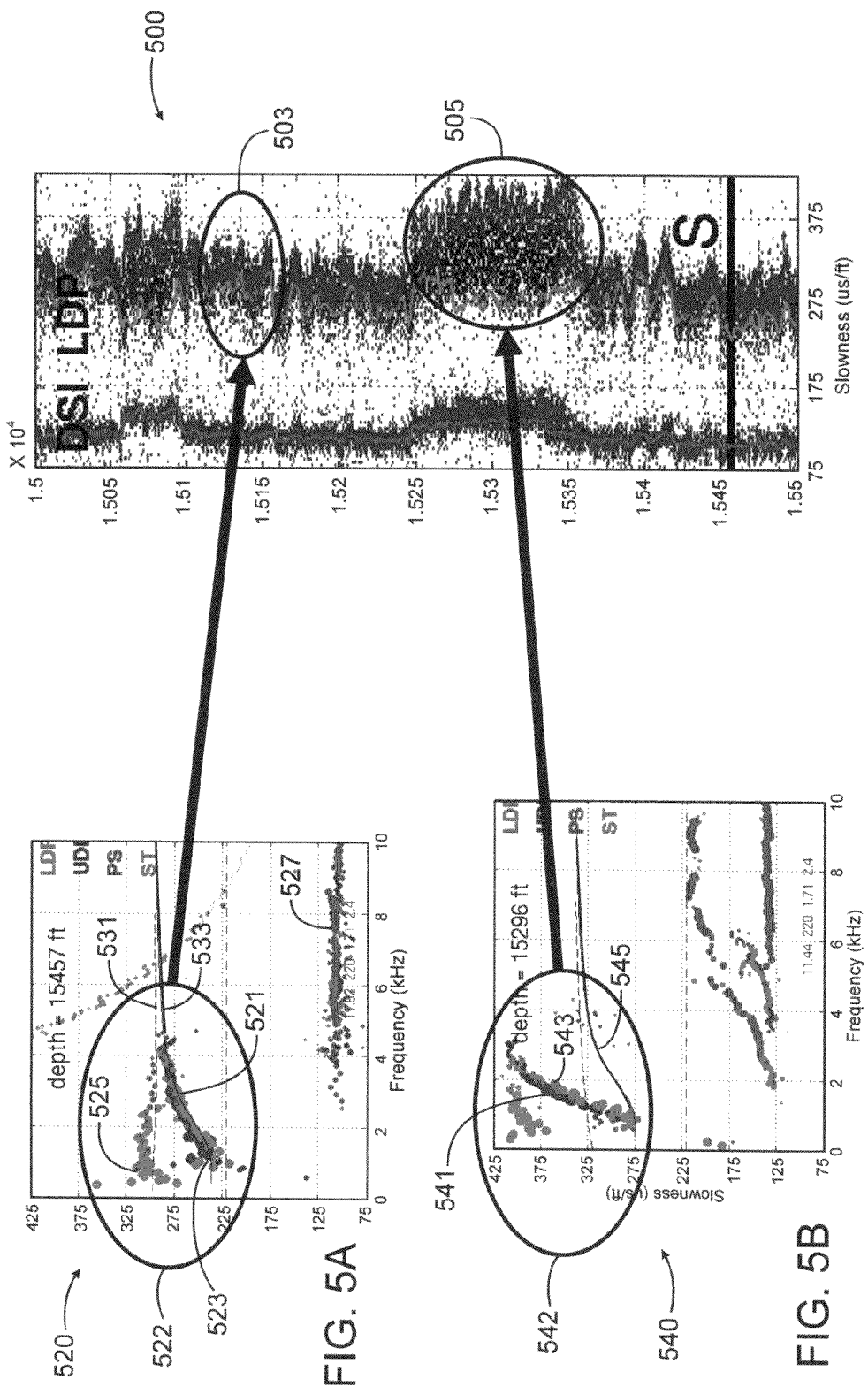

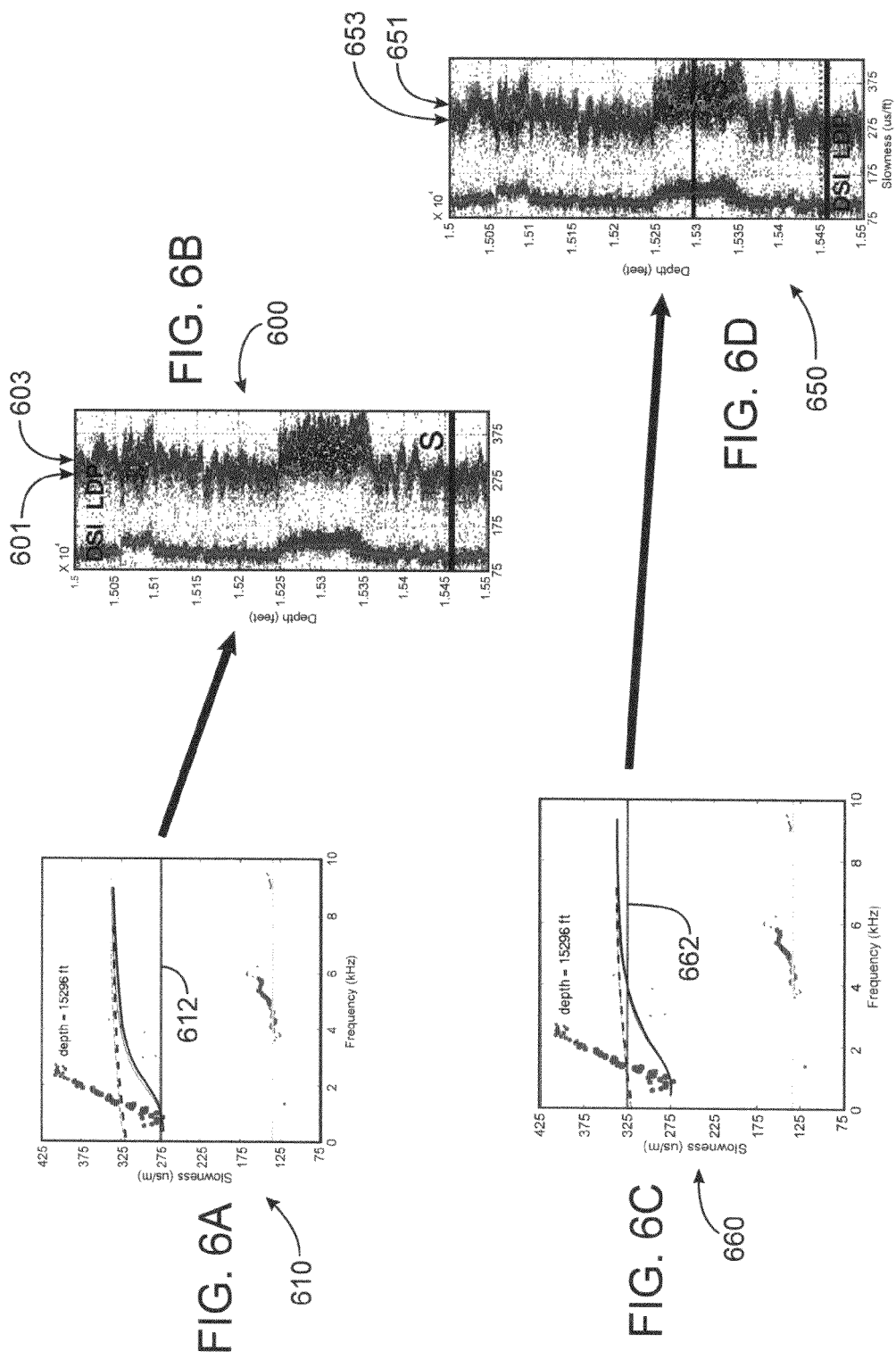

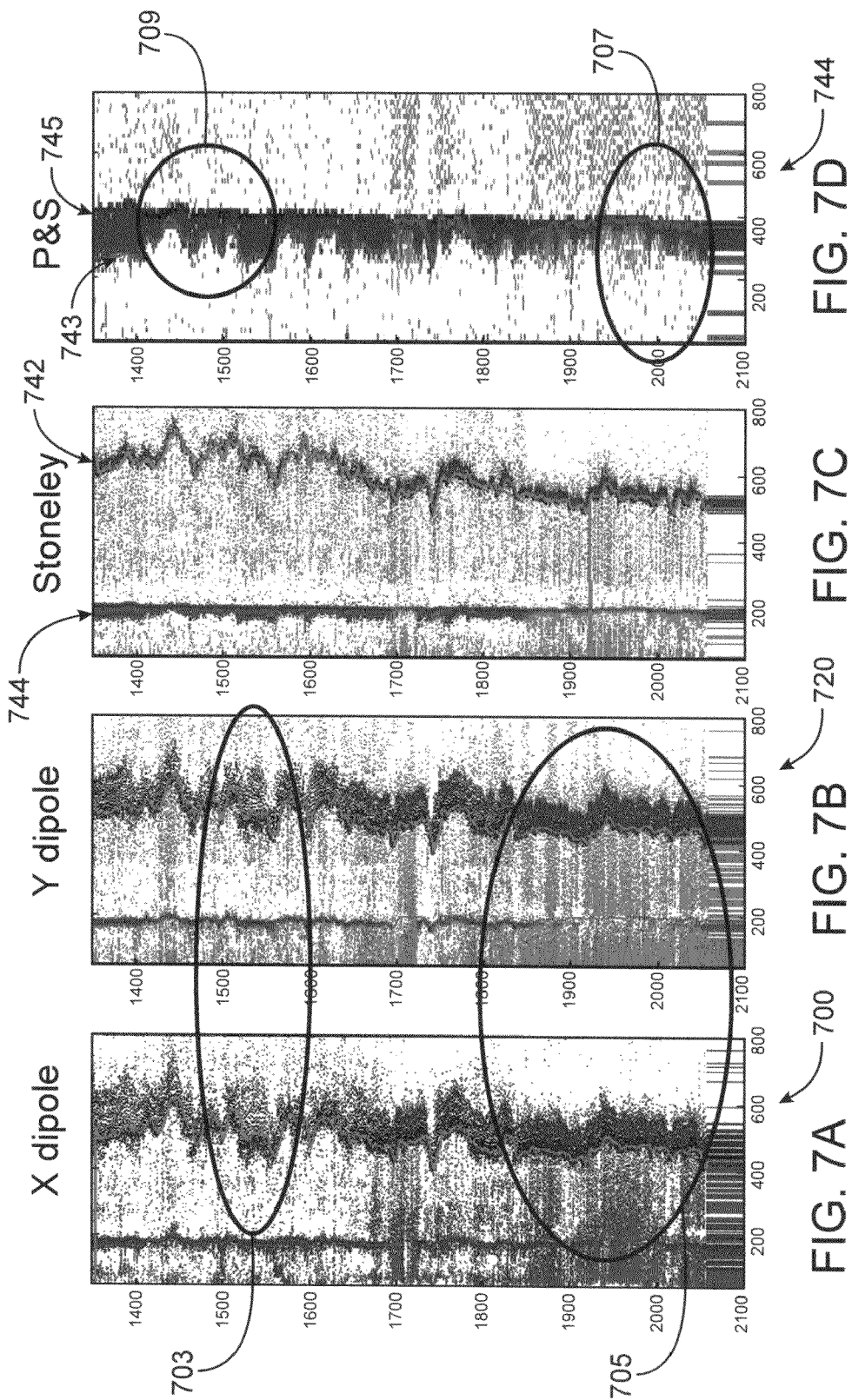

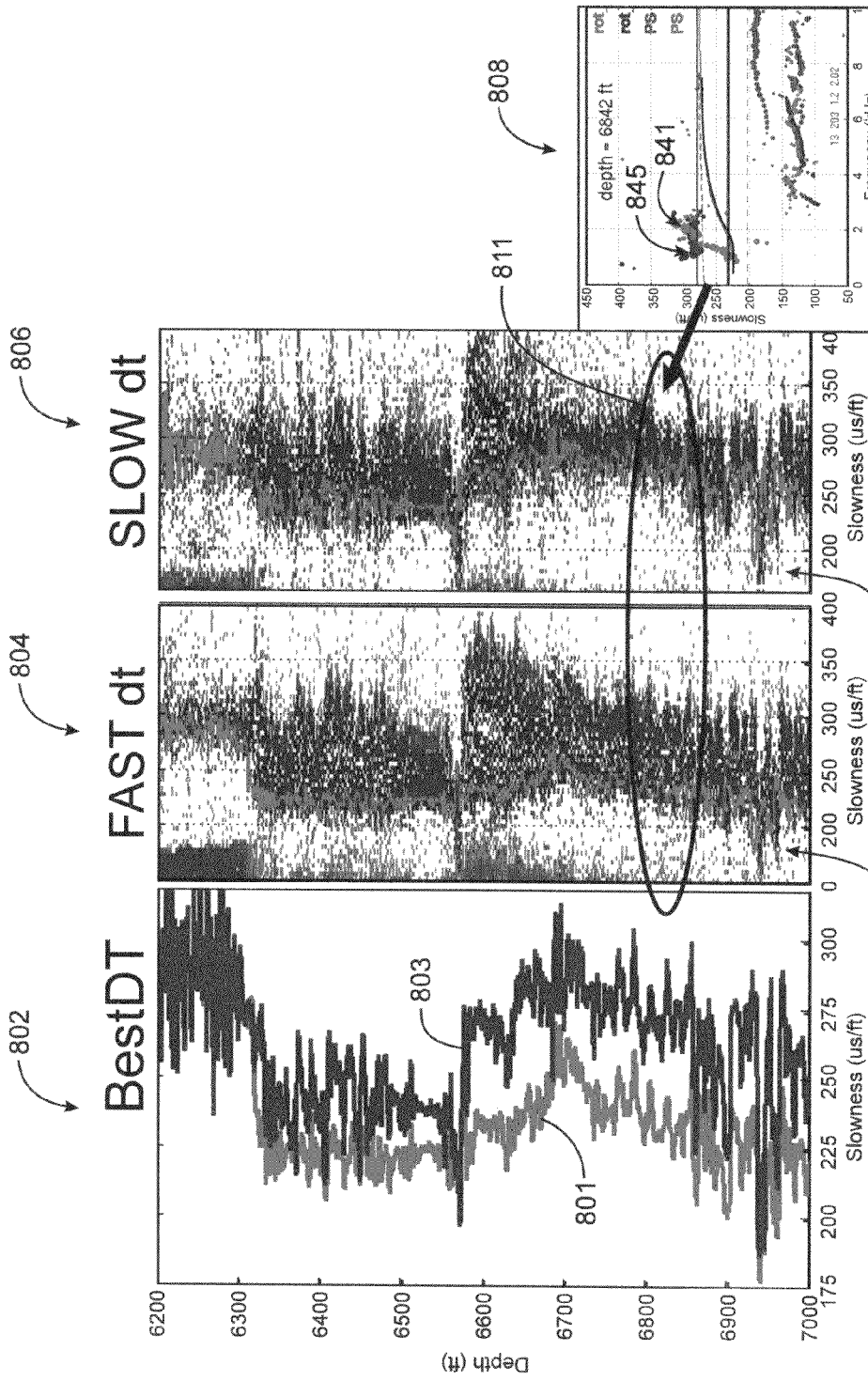

US 7,643,374 B2

SLOWNESS-FREQUENCY PROJECTION DISPLAY AND ANIMATION

RELATED APPLICATIONS

This is a continuation-in-part of U.S. patent application Ser. No. 10/789,210, filed Feb. 27, 2004, which is hereby incorporated herein in its entirety by this reference.

BACKGROUND

The present disclosure relates to investigation of earth formations and, more particularly, to techniques for displaying sonic well logging information in a manner which provides for reliable quality-control (QC) indicators.

It is well known that mechanical disturbances can be used to establish acoustic waves in earth formations surrounding a borehole, and the properties of these waves can be measured to obtain important information about the formations through which the waves have propagated. Parameters of compressional, shear and Stoneley waves, such as their velocity (or its reciprocal, slowness) in the formation and in the borehole, can be indicators of formation characteristics that help in evaluation of the location and/or producibility of hydrocarbon resources. An example of some techniques which may be used for determining properties of earth formations using sonic well logging is described in U.S. Pat. No. 6,614,716 to Plona et at, herein incorporated by reference in its entirety for all purposes.

Sonic logging tools may be used to collect an array of waveforms from either monopole, dipole or quadrupole sources. Wireline logging tools typically use the monopole and dipole modes, while drilling sonic tools (LWD) use the monopole and quadrupole modes. Each of the different modes generates an array of waveforms which can be processed using a variety of techniques to obtain an estimate of formation slowness. One such technique is semblance processing, described, for example, in U.S. Pat. No. 4,594,691 to Kimball et al., herein incorporated by reference in its entirety for all purposes. In the semblance processing technique, data is gathered and processed from an array of received waveforms from a particular source (e.g., dipole source) at one particular depth. This is illustrated, for example, in FIG. 1A.

FIGS. 1A-B show a set of model calculations for acoustic wave propagation in a circular borehole with a centralized dipole source. FIG. 1A shows an array of 6 received waveforms from a dipole source at one particular depth. In these waveforms one observes two arrivals moving across the array. The first arrival in time is a dipole compressional signal 104, and the second, later in time signal, is the arrival of the dipole flexural signal 102. In conventional semblance processing, the semblance parameter as a function of wave slowness vs. time is calculated and displayed as shown, for example, in FIG. 1B. FIG. 1B illustrates a graphical representation of the Slowness-Time-Coherence (STC), or semblance, processing of the received waveforms of FIG. 1A. As shown in the example of FIG. 1B, a compressional semblance contour 114 is located near 125 µs/ft and a shear semblance contour 112 is located near 300 µs/ft. The local peak of the semblance contour is then plotted on a sonic log as the formation parameter (i.e., slowness) at each depth. A typical sonic log is shown, for example, in FIG. 2. FIG. 2 shows an example of a conventional slowness log, illustrating, for example, a compressional slowness curve 201 (green) from a monopole source, a fast shear slowness curve 203 (red) from a dipole source, a slow shear slowness curve 205 (blue) from a dipole source, and a monopole Stoneley slowness curve 207 (purple).

For dipole flexural data, it is well-known that the low frequency limit (e.g., zero frequency) of a dipole flexural curve asymptotes to the true formation shear speed. Thus, in conventional semblance processing, it is desirable that the peak semblance calculation at each depth correspond to the low frequency limit of the dispersion curve at that depth. In this regard, various techniques have conventionally been used to help ensure that the calculated peak semblance data correspond to the low frequency limits of their respective flexural dispersion curves. However, as described in greater detail below, there are currently no mechanisms available by which to adequately quality control the accuracy of such techniques.

For example, a current technique for quality control corresponds to projecting the semblance contours onto the slowness axis to derive a one dimensional set of numbers at each depth, and then use this data to generate an estimate of shear slowness of the flexural dispersion curves across multiple depths. Such a technique is illustrated, for example, in FIGS. 3A-E of the drawings.

FIG. 3A-E illustrate a conventional procedure for constructing a Slowness-Time-Coherence (i.e., semblance) projection log which may be used for quality control analysis of sonic logs. As shown in FIGS. 3A-B, the semblance contours 302, 304 are projected onto the slowness axis to derive a one dimensional set of numbers 310. The slowness projections at each depth are rotated (FIG. 3C) and compiled to generate a log 330 of slowness projection as a function of depth, as shown, for example, in FIG. 3D. Finally, as shown in FIG. 3E, the estimated shear slowness curve (dts) 336 is plotted on top of the log projection 330.

A significant problem with quality control display of FIG. 3E, however, is that there is no way of knowing from the displayed information if the estimated dts 336 actually corresponds to the low frequency limit of the dipole flexural dispersion curve at each depth. Since the estimated dts curve 336 may be generated using a variety of mathematical algorithms and/or computer data processing techniques, errors in the calculation of the estimated dts may result in a poor quality estimated dts curve which does not correspond to the low frequency limit of the dipole flexural. Thus it will be appreciated that there exists a need to provide improved quality-control (QC) indicators for sonic logging data.

SUMMARY

According to several embodiments disclosed herein, various methods, systems, and/or computer program products are disclosed for facilitating quality control (QC) analysis of sonic logging data associated with an earth formation surrounding a borehole. In at least one embodiment, slowness frequency analysis (SFA) log information is generated. According to one implementation, the SFA log information includes slowness-versus-frequency dispersion curve information associated with a first depth interval. The SFA log information may then be displayed in a graphical format to thereby produce an SFA log display. In one implementation, the SFA log display includes a first axis corresponding to depth, and a second axis corresponding to wave slowness, and a third axis corresponding to frequency.

According to at least one embodiment, the information displayed in the SFA log display may be presented in a manner which enables an observer of the SFA log display to visually compare relative frequency dispersive characteristics of the displayed dispersion curve over selected portions of the first depth interval. Additionally, in at least one implementation, the information displayed in the SFA log display may be presented in a manner which enables an observer of the SFA log display to visually assess homogeneous and inhomogeneous characteristics of the formation over selected portions of the first depth interval. In another implementation, the information displayed in the SFA log display may also be presented in a manner which enables an observer of the SFA log display to visually assess isotropic and anisotropic characteristics of the formation over selected portions of the first depth interval. In other implementations, estimated wave slowness information associated with the selected portions of the first depth interval may be generated using the slowness-versus-frequency dispersion curve information. An overlay of the estimated wave slowness information may then be displayed onto the SFA log display. According to at least one embodiment, the display of the overlay information onto the SFA log display is presented in a manner which enables an observer of the SFA log display to visually assess the relative accuracy of the estimated wave slowness information over selected portions of the first depth interval. In a further embodiment, the SFA log display may also include a navigable pointer mechanism configured or designed to allow a user to navigate within the SFA log display in order to access depth specific sonic logging information associated with selected depths. In at least one implementation, the SFA log display may be configured or designed to display selected characteristics of the depth specific sonic logging information concurrently with the SFA log information.

Alternate embodiments are directed to various methods, systems, and/or computer program products for generating a slowness frequency analysis (SFA) projection log of selected properties of an earth formation surrounding a borehole. The SFA projection log may be generated using dispersion curves characterized in terms of wave slowness versus wave frequency. According to one embodiment, a first portion of dispersion curve information for a first selected depth is projected onto a slowness axis of a dispersion curve plot to thereby generate a first portion of projected dispersion curve information. A first SFA projection log may then be generated. According to one implementation the first SFA projection log includes projected dispersion curve associated with a first depth interval. Additionally, in at least one embodiment the first portion of the projected dispersion curve information is represented in the first SFA projection log at a depth value corresponding to the first selected depth. Additional embodiments include displaying on a 3-D display with slowness-frequency-depth axes. The displayed slowness-versus-frequency dispersion curves versus depth may be projected onto a slowness-depth plane to display the wave slowness characteristics versus depth. As is known, wave properties, such as amplitude, energy, attenuation, coherence, among others, are associated with a dispersion curve. These wave properties are known as "attributes." Attributes may also be a function of frequency. The disclosure herein includes generating slowness-versus-frequency dispersion curves with at least one associated attribute for each depth, and the slowness-versus-frequency dispersion curve and the at least one associated attribute may be displayed versus depth. In aspects herein, the displaying is performed on a 3-D display with slowness-frequency-depth axes, and the at least one associated attribute comprises coherence, amplitude, energy, attenuation. The attribute may be displayed using color coding. The attribute may be displayed using symbols and/or the sizes of symbols.

Additional objects, features and advantages will become apparent from the following description taken in conjunction with the accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 1A-B show a set of model calculations for acoustic wave propagation in a circular borehole with a centralized dipole source.

FIG. 2 shows an example of a conventional slowness log.

FIGS. 3A-E illustrate a conventional procedure for constructing a Slowness-Time-Coherence (i.e., semblance) projection log which may be used for quality control analysis of sonic logs.

FIGS. 4A-F illustrate various techniques which may be used for constructing a Slowness Frequency Analysis (SFA) projection log in accordance with one embodiment of the present disclosure.

FIGS. 5A-C illustrate one example of the SFA projection log display technique disclosed herein.

FIGS. 6A-D illustrate another example of the SFA projection log display technique disclosed herein.

FIGS. 7A-D of the drawings illustrate alternate embodiments of how the SFA projection log display technique disclosed herein may be used to display SFA projection logs for different modes of a wireline sonic tool.

FIGS. 8A-D illustrate one embodiment of an anisotropic SFA projection log display technique of the present disclosure.

DETAILED DESCRIPTION

Figure 4F:
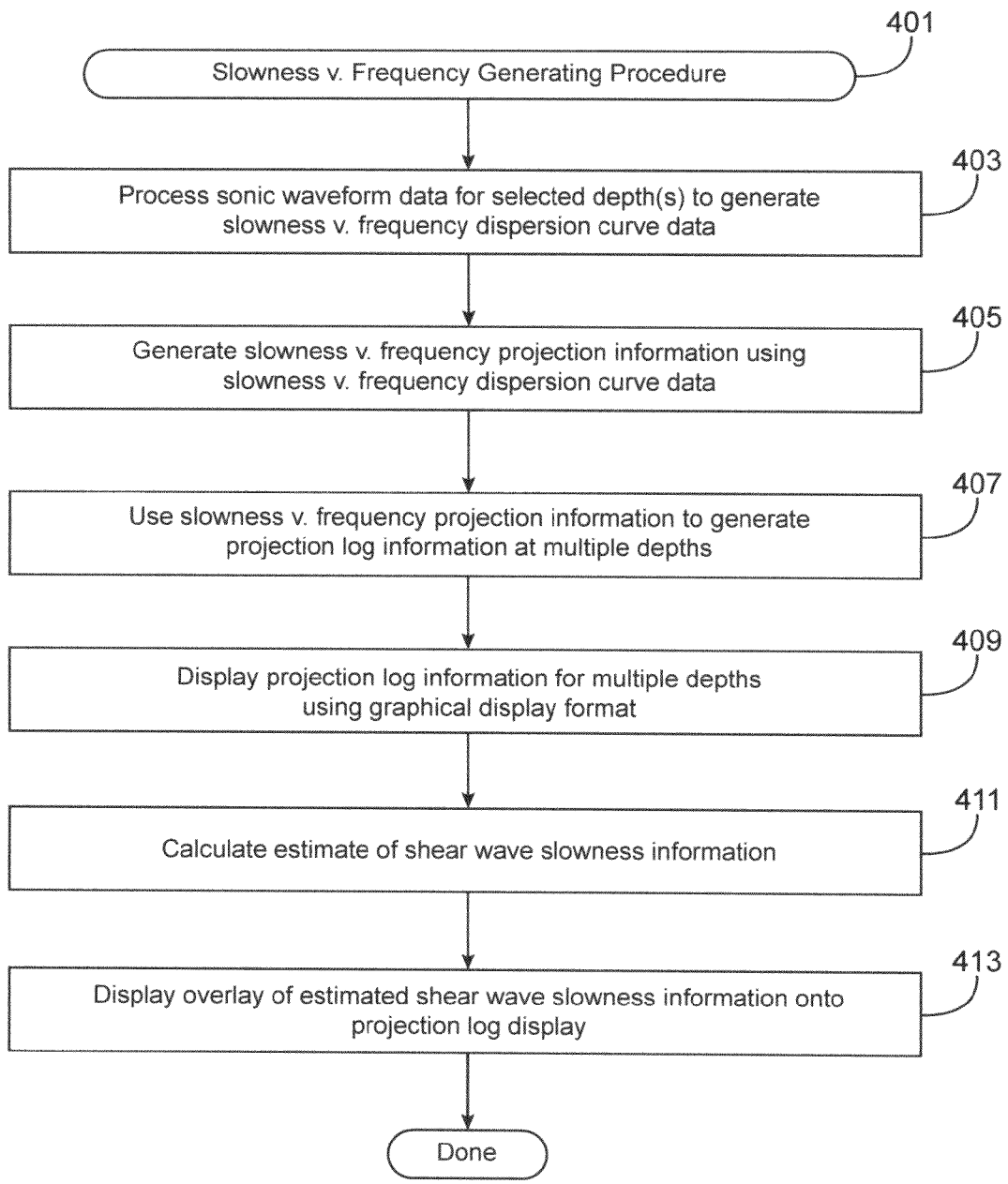

The present disclosure describes several techniques for displaying sonic logging data that provide highly reliable, quality-control (QC) indicators which are superior to previous QC indicators. As described in greater detail below, one aspect herein is directed to a novel display of sonic logging data corresponding to a slowness-frequency projection log (i.e., SFA projection log). One of the benefits of the SFA projection log display of the present invention is that the format of the information displayed may be used to quickly and easily verify or QC the accuracy/inaccuracy of the processed sonic logging data, as well as to identify any potential problematic or inconsistent portions of the sonic logging data which may generate erroneous results. Specific embodiments described herein include various graphical displays of the dispersion curves. Displays of dispersion curves can be used, for example, for wireline sonic data as well as logging-while-drilling (LWD) sonic data.

Generally, it is well known that for wave propagation in a borehole, dipole flexural signals are highly dispersive in nature. Accordingly, conventional wisdom in the field of sonic logging teaches that it is desirable to minimize the dispersive nature of sound pulses in order to obtain a more accurate estimate of shear slowness at the low frequency limit of the dipole flexural dispersion. In order to minimize the dispersive nature of such sound pulses, many of today's operators in the sonic logging industry attempt to utilize dipole sound pulses which have been designed to emit only low frequencies (e.g., below 1 kHz) which are sufficient to minimize the dispersive nature of the dipole sound pulse.

Contrary to the above-described conventional wisdom, however, the present inventive entity has discovered that the dispersive nature of dipole wave propagation in a borehole can be advantageously utilized to generate sonic logging data that provides highly reliable, quality-control (QC) indicators which are superior to conventional QC indicators. For example, many aspects of the present disclosure take advantage of the understanding that dispersion curves (i.e., slowness vs. frequency) provide much more useful QC-related information than semblance contours (i.e., slowness vs. time). This is shown, for example, in FIGS. 4A-4E of the drawings.

FIGS. 4A-E illustrate various techniques which may be used for constructing a Slowness Frequency Analysis (SFA) projection log in accordance with one embodiment of the present disclosure. FIG. 4F illustrates a flow diagram of an SFA Projection Log Generating Procedure 401 in accordance with one embodiment disclosed herein. According to one implementation, the SFA Projection Log Generating Procedure of FIG. 4F may be used to generate at least a portion of the displays illustrated in FIGS. 4A-4E of the drawings.

One of the novel aspects of the present invention is that many of the graphical displays described in the present application are based upon dispersion curves (i.e., slowness vs. frequency), rather than the conventional practice of graphically displaying sonic logging data based upon semblance contour data (i.e., slowness vs. time). Details of dispersion curves depend on factors such as, for example, borehole size, formation density and slownesses, mud slowness and density, etc. Generally, a dispersion curve includes information about the slowness at each frequency that is contained in the received waveforms at a particular depth. This is shown, for example, in FIG. 4A of the drawings.

FIG. 4A shows an example of a dispersion curve display 400 in accordance with one embodiment of the present disclosure. In the example of FIG. 4A, the data in display 400 corresponds to a dispersion curve derived from the waveforms generated by a dipole source at a particular depth (i.e., depth=15457 feet), and is displayed in terms of slowness vs. frequency. As known to those skilled in the art, "dispersion curve" means the graphical representation of the slowness of a wave as a function of frequency. In practice, a dispersion curve is estimated one frequency point at a time. Therefore, a dispersion curve may or may not be a continuous curve. The dipole flexural data of FIG. 4A is illustrated by the group of data points 402, and corresponds to shear wave slowness v. frequency. Using these data points, the estimated shear wave slowness at the low frequency limit (i.e., zero frequency) at this particular depth may be calculated and displayed as shown, for example, at 406.

According to at least one embodiment, the correctly estimated shear slowness of the formation occurs when the estimated value of the shear slowness lies at the low frequency limit of the measured data. It can be seen from the data displayed in FIG. 4A that the dipole flexural data 402 is dispersive in nature, meaning that the shear slowness changes as a function of frequency. Additionally, as shown in FIG. 4A, the dipole compressional data is illustrated by the group of data points 404. Using these data points, the estimated compressional wave slowness (at this particular depth) may be calculated and displayed as shown, for example, at 408. It can be seen from the data displayed in FIG. 4A that the dipole compressional data 404 is non-dispersive in this particular case. It should be appreciated that, in general, dipole compressional is dispersive in nature (see, e.g., FIG. 5B). Various techniques for generating the data illustrated in FIG. 4A are generally known to one having ordinary skill in the art, and are described in various references such as, for example, U.S. Pat. No. 6,614,716 to Plona et at, previously incorporated herein by reference in its entirety for all purposes.

In FIG. 4B the slowness-frequency data of FIG. 4A is projected onto the slowness axis by collapsing the frequency axis. This operation may be implemented using a variety of mathematical techniques generally known to one having ordinary skill in the art. According to one embodiment, the projected slowness information uniquely captures the dispersion nature of the dipole flexural signal. The data may then be arranged from low to high slowness for this single depth. The slowness-frequency projected data of FIG. 4B may then be rotated (FIG. 4C) and used in compiling a slowness frequency analysis (SFA) projection log such as that shown, for example, in FIG. 4D. It will be appreciated that, in alternate embodiments herein, the operation of rotating the slowness-frequency projected data (as illustrated, for example, in FIG. 4C) may be omitted, for example, in situations where the depth axis of the SFA projection log information is oriented horizontally rather than vertically. It is also noted that the SFA projection log shown in FIGS. 4D-4E displays the dispersion curves that are derived from the acquired sonic data.

FIG. 4D shows an example of a slowness frequency analysis (SFA) projection log 460 in accordance with a specific embodiment of the present disclosure. In essence, the SFA projection log is the projection of dispersion curves onto the slowness-depth plane. The projection log 460 represents a novel display format of sonic logging data, wherein a log of the projections of dispersion curves (e.g., slowness v. frequency sonic logging data) across multiple depths is displayed in an easy-to-read visual format on the slowness-depth plane. As shown in the embodiment of FIG. 4D, the horizontal axis of the graphical display 460 corresponds to wave slowness (in μs/ft.), and the vertical axis corresponds to depth (in ft.×$10^4$). Thus, for example, the slowness data at depth 1.5457×$10^4$ feet (shown at 465) corresponds to the slowness-frequency projected onto the slowness-depth plane for compressional and dipole flexural data derived from the slowness v. frequency dispersion curve of FIG. 4A. Accordingly, it will be appreciated that the SFA projection log on the slowness-depth plane of FIG. 4D visually illustrates the dispersive nature of both the dipole flexural (464) and the dipole compressional (466) over a desired depth interval, which can be used to verify the reliability and/or accuracy of the formation shear log. According to one embodiment, the SFA projection log of FIG. 4D may be displayed electronically using a computer user interface such as, for example, a graphical user interface (GUI). Alternatively, in a different embodiment, the SFA projection log of FIG. 4D may be displayed using other conventional display techniques such as, for example, ink and paper.

It will be appreciated that wave slowness is inversely proportional to wave velocity, and that the wave frequency is inversely proportional to wave period. Accordingly, alternate embodiments of the SFA projection log may include embodiments where the information is displayed in terms of slowness v. frequency, velocity v. frequency, slowness v. period, and/or velocity v. period. For example, in one embodiment, the SFA projection log data may be generated using slowness-versus-frequency dispersion curve information that has been expressed in terms of wave slowness. Further, the SFA projection log data may be include wave slowness characteristics expressed in terms of wave slowness. In an alternate embodiment, the SFA projection log data may be generated using slowness-versus-frequency dispersion curve information that has been expressed in terms of wave velocity, and the SFA projection log data may include wave slowness characteristics expressed in terms of wave velocity.

According to different embodiments, additional information may be overlaid onto the SFA projection log in order to provide, for example, additional quality control indicators. Such additional overlay information may include, for example, estimates of desired data characteristics plotted over multiple depths. Examples of desired data characteristics include shear wave slowness, shear wave velocity, compressional wave slowness, compressional wave velocity, Stoneley wave slowness, Stoneley wave velocity, etc. For example, as shown in the embodiment of FIG. 4E, the SFA projection log 480 includes an overlay "dts" curve 482 representing the estimate of shear slowness values at zero frequency of the dipole flexural at multiple depths. Additionally, as shown in FIG. 4E, the SFA projection log 480 also includes an overlay "dtc" curve 484 representing the estimate of compressional slowness values at zero frequency of the dipole compressional at multiple depths.

As described in greater detail below, the display of sonic logging data in the format shown in FIGS. 4D and/or 4E provides highly reliable, quality-control (QC) indicators which are superior to those of conventional display techniques. For example, in the embodiment depicted in FIG. 4E, it can be quickly and easily ascertained that the estimated shear slowness curve (red line, 482) clearly lies at the low end of the slowness range of the projected dipole flexural dispersion curve 464. To one having ordinary skill in the art, this would indicate that, in this example, the estimate of the shear slowness is substantially correct. Thus, one advantage of the display of FIG. 4E is that the observer is able to quickly and easily verify whether the estimated slownesses displayed are consistent with the dispersion nature of the measured data. Such a feature is an extremely desirable quality control (QC) feature of dipole flexural data for the estimation of formation shear.

As described previously, the SFA Projection Log Generating Procedure of FIG. 4F may be used to generate at least a portion of the displays illustrated in FIGS. 4A-4E of the drawings. For purposes of illustration, the operations depicted in FIG. 4F will now be described by way of example with reference to FIGS. 4A-4E of the drawings. Initially, as shown at 403, the sonic waveform data for selected depths may be processed in order to generate slowness v. frequency dispersion curves such as that shown, for example, in FIG. 4A. The generated slowness v. frequency dispersion curves may then be used to generate (405) the slowness v. frequency projection data such as that shown, for example, in FIG. 4B. In the embodiments shown in FIGS. 4A and 4B, the two dimensional data of FIG. 4A is projected onto the slowness axis, thereby producing a one dimensional representation of the dispersion curves displayed in FIG. 4A. In alternate embodiments, however, the two dimensional data of FIG. 4A may be used in generating a three-dimensional version of the SFA projection log illustrated, for example, in FIG. 4D. In such alternate embodiments, the operations relating to the projection of dispersion curves into one dimension may be omitted.

Returning to FIG. 4F, at 407 the slowness v. frequency projection data may be used to generate slowness v. frequency log data for multiple depths. In at least one embodiment, the data generated at 407 is used to generate the SFA projection log 460 of FIG. 4D. The generated slowness v. frequency log data may then be displayed (409) using a desired user interface such as that shown, for example, in FIG. 4D.

As described previously with respect to FIG. 4E, additional information may be overlaid onto the SFA projection log in order to provide additional quality control indicators. For example, as shown in the embodiment of FIG. 4E, the SFA projection log 480 includes an overlay "dts" curve 482 representing the estimate of shear slowness values at zero frequency of the dipole flexural at multiple depths. In order to display such overlay information, the estimate of the shear wave slowness at zero frequency may be calculated (411, FIG. 4F) for multiple depths, and displayed (413) as shown, for example, in FIG. 4E. According to different embodiments, calculation of the overlay information may be performed at any desired time during the SFA Projection Generating Procedure, which may include, for example, performing such calculations in parallel with other operations described herein.

Other features and advantages of the SFA projection log display technique of the present invention will now be described by way of example with reference to FIGS. 5-11 of the drawings. FIGS. 5A-5C illustrate one example of the SFA projection log display technique. More specifically, the example of FIGS. 5A-5C may be used to indicate the relationship of the individual dispersion curves of FIG. 5A and FIG. 5B to the SFA projection log of FIG. 5C. For example, the dispersion curve illustrated in FIG. 5A illustrates a case at a first depth where the formation is homogeneous and isotropic. In this case, the red dipole dispersion curve 521 and blue dipole dispersion curve 523 (the red/blue curves are two orthogonal dipoles) overlay each other, indicating isotropy.

The green compressional curve 527 indicates that it is nondispersive since its slowness characteristics do not seem to be dependent upon frequency. The Stoneley curve 525 (cyan) is also relatively flat in this case, but, in general is dispersive in nature. The model curves (black) for the dipole flexural (533) and Stoneley (531) are seen to fit the data very well. Since the model substantially fits the data, this indicates that the formation is homogeneous (e.g., no radial gradients) and isotropic.

The dispersion curve illustrated in FIG. 5B illustrates a case at a second depth where the formation is inhomogeneous and isotropic. An inhomogeneous formation has radial gradients of slownesses (shear and compressional). In FIG. 5B, the inhomogeneous nature of the formation is identified by the very steep dipole flexural dispersion curves 543 (red) and 541 (blue) as compared with the model the dipole flexural curve 545. This understanding of homogeneity/inhomogeneity and isotropy/anisotropy can be obtained from studying the dispersion curves of FIGS. 5A and 5B. This information can also be captured for a desired depth interval by using a slowness-frequency (SFA) projection log, such as that illustrated, for example, in FIG. 5C. In the example of FIG. 5C, dipole data relating to the displayed depth interval (which includes, for example, the red dipole data (521, 543) from FIGS. 5A and 5B) is used to construct the slowness-frequency (SFA) projection log 500 illustrated in FIG. 5C.

In FIG. 5C, one observes that when the formation is homogeneous (as in FIG. 5A), the dipole dispersion curve has a relatively small slowness projection on the SFA projection log (as illustrated at 503). In contrast, when the formation shows inhomogeneity (e.g., radial gradients of slowness, as illustrated in FIG. 5B), the SFA projection log shows a relatively wide slowness band (as illustrated at 505). In the example of FIG. 5C, the relatively wide slowness band at 505 extends approximately over a 100 ft. interval, which may indicate the possibility of "mechanically damaged" rock within that interval. Thus, it will be appreciated that the SFA projection log display of FIG. 5C may be used by an observer to perform visual QC analysis, whereby specific properties and/or characteristics (e.g., homogeneity/inhomogeneity, isotropy/anisotropy, etc.) of the earth formation surrounding a borehole may be quickly and accurately identified.

Another advantage of the SFA projection log display of the present invention is that it may be used to visually verify the accuracy and/or quality of estimated data characteristics such as, for example, the estimated shear slowness at zero frequency over a given depth interval. This is illustrated, for example, in FIGS. 6A-6D of the drawings.

FIGS. 6A-6D illustrate a different example of the SFA projection log display technique. As illustrated in FIG. 6A, the estimated shear slowness (indicated by the horizontal line 612) at the given depth is properly located near the low frequency limit of the dipole flexural dispersion curve. In the SFA projection log display of FIG. 6B, one observes that, over the entire depth interval, the estimated shear slowness log values (red line 601) lies at or relatively near the lower edge (i.e., left edge) of the dipole flexural slowness band 603. Based upon this visual observation, one having ordinary skill in the art would be able to perform a visual QC analysis to verify that the SFA projection log of FIG. 6B (including the estimated shear slowness data) is relatively accurate and/or of good quality.

In contrast, referring to the example of FIG. 6C, it can be seen from the dispersion curve plot at the given depth that the estimated shear slowness at 662 is significantly offset at a value substantially greater than the apparent low frequency limit of the dipole flexural data. More importantly, when one studies the corresponding SFA projection log display in FIG. 6D, it is observed that, over the entire log shown, the estimated shear slowness curve (red line 651) lies significantly higher than the low frequency limit (i.e., lower edge) of the dipole flexural slowness band 653. Thus, the SFA log display of FIG. 6D provides a clear and readily understandable indication that the estimated shear slowness log values (presented as the red curve 651) are inaccurate and/or of poor quality.

It will be appreciated that such a feature is not provided by any of the conventional sonic logging data display techniques. For example, as described previously with respect to FIGS. 2 and 3D of the drawings, conventional sonic logging display techniques provide no QC mechanism for ascertaining or verifying, from the displayed information, whether the estimated shear slowness log data actually corresponds to or approximates the low frequency limit of the dipole flexural dispersion curve for the entire depth interval. In contrast, as illustrated in the example of FIGS. 6A-D, the display techniques of the present disclosure advantageously provides the ability to perform a visual QC analysis of a sonic logging data log in order to ascertain or verify the relative quality characteristics of the log data.

It will be appreciated that alternate embodiments of the SFA projection log display techniques may be used to evaluate a variety of different data types, such as, for example, dipole data, monopole data, quadrupole data, etc. Additionally, according to at least one embodiment, different SFA projection logs may be generated for each type of wireline sonic acquisition mode such as, for example, X-dipole, Y-dipole, low-frequency monopole (Stoneley), high-frequency monopole (P&S), as well as sonic while drilling quadrupole modes. This is illustrated, for example, in FIGS. 7A-7D of the drawings.

FIGS. 7A-7D of the drawings illustrate alternate embodiments of how the SFA projection log display techniques of the present disclosure may be used to display SFA projection logs for different modes of a wireline sonic tool. FIG. 7A illustrates one embodiment of an SFA projection log which displays fast dipole shear (i.e., X dipole) data for a given depth interval. FIG. 7B illustrates one embodiment of an SFA projection log which displays slow dipole shear (i.e., Y dipole) data for the given depth interval. FIG. 7C illustrates one embodiment of an SFA projection log which displays low-frequency monopole Stoneley acquisition data 742 for the given depth interval. The SFA projection log of FIG. 7C also displays high frequency monopole compressional acquisition data 744, which is illustrated in greater detail in FIG. 7D. FIG. 7D illustrates one embodiment of an SFA projection log which displays high frequency monopole compressional acquisition data for the given depth interval.

As shown in the examples of the dipole SFA projection logs of FIGS. 7A and 7B, one observes regions 705 where the estimated shear slownesses data "fit" (i.e., lie substantially near to) the lower limit of the dipole flexural projection data. Additionally, in this example, one also observes regions 703 where the estimated shear slowness data does not fit (i.e., does not lie substantially near to) the lower limit of the dipole flexural projection data, which indicates that the estimated shear slownesses are incorrect and/or inaccurate.

Using the display techniques herein, it is also possible to identify incorrectly estimated compressional slownesses data, for example, by observing the compressional SFA log shown in FIG. 7D. It will be appreciated that leaky compressional modes are dispersive, starting at a certain cutoff frequency with the formation compressional slowness and increasing towards the borehole fluid slowness at higher frequency. In the example of FIG. 7D, at an upper portion 709 of the log, the estimated compressional slowness curve (green line 743) is consistent with (i.e., fits) the low frequency limit of the projected leaky compressional data. In contrast, in the lower portion 707 of FIG. 7D, the estimated compressional data is clearly not consistent with or substantially near to the lower edge of the projected leaky compressional data. This visual observation may indicate that the estimated compressional slownesses is incorrect or inaccurate.

FIGS. 8A-D illustrate one embodiment of an anisotropic SFA projection log display technique of the present disclosure. In this example, FIG. 8A shows log values for the fast dipole shear data 801 and the slow dipole shear data 803 for a given depth interval. From this display, one can readily observe the anisotropy (slowness difference) characteristics of the earth formation at this depth interval. FIG. 8B shows a slowness projection log of the fast dipole shear data for the given depth interval, and also displays an overlay (red curve 813) of the estimated shear slowness at the lower limit (e.g., zero frequency) of the dipole flexural data over the given depth interval. FIG. 8C shows a slowness projection log of the slow dipole shear data for the given depth interval, and also displays an overlay (red curve 823) of the estimated shear slowness at the lower limit of the dipole flexural data over the given depth interval. One can observe from the displayed information of FIGS. 8B and 8C that the estimated shear slowness data is consistent with (e.g., substantially at or near to) the low frequency limit of the projected flexural dispersion curve. This visual observation indicates that the derived formation shear slownesses estimates are correct/accurate.

FIG. 8D displays dispersion curves generated from sonic logging data that was collected at a specific depth (e.g., depth=6842 ft.). The relatively wide slowness band of the fast dipole dispersion data (red data 841) and the relatively narrow slowness band of the slow dipole dispersion data (blue data 845) indicates that the anisotropy characteristics of the formation is stress induced. FIG. 8D is also clearly present in the SFA projection log display of FIGS. 8B and 8C, as indicated at 811. Over a large depth interval around 811, one observes that the fast dipole dispersion slowness band is relatively wide while the slow dipole dispersion slowness band is relatively narrow. Based on this visual observation, one having ordinary skill in the art may conclude that the anisotropy is stress induced over a large depth interval. In contrast, if the width of the two slowness bands were very similar, it would suggest that the anisotropy is intrinsic in nature.

Figure 9A:
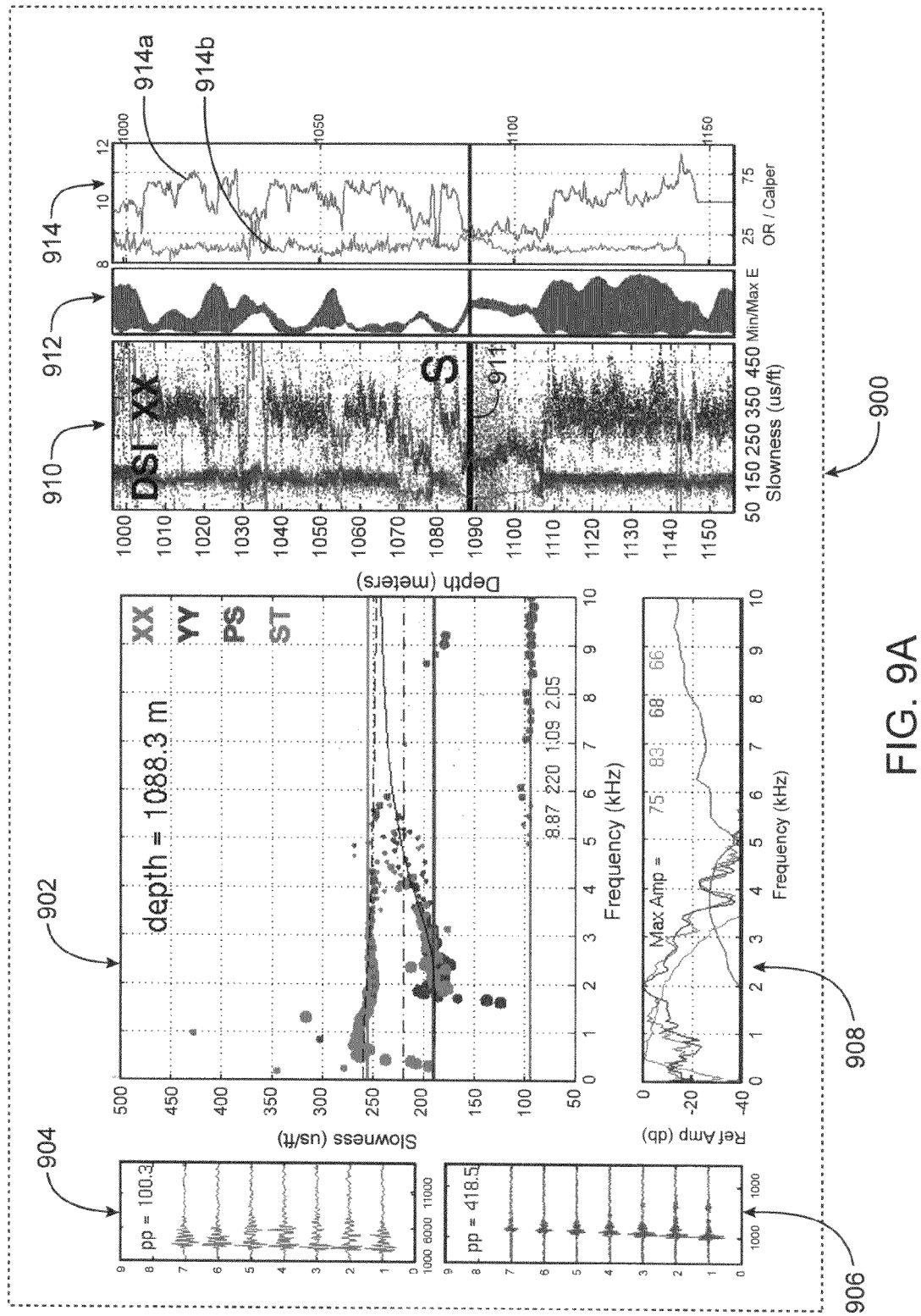
FIGS. 9A-C illustrate another embodiment of the display technique of the present disclosure which may be used, for example, as part of a navigable or animated display of sonic logging data.
Figure 9B:
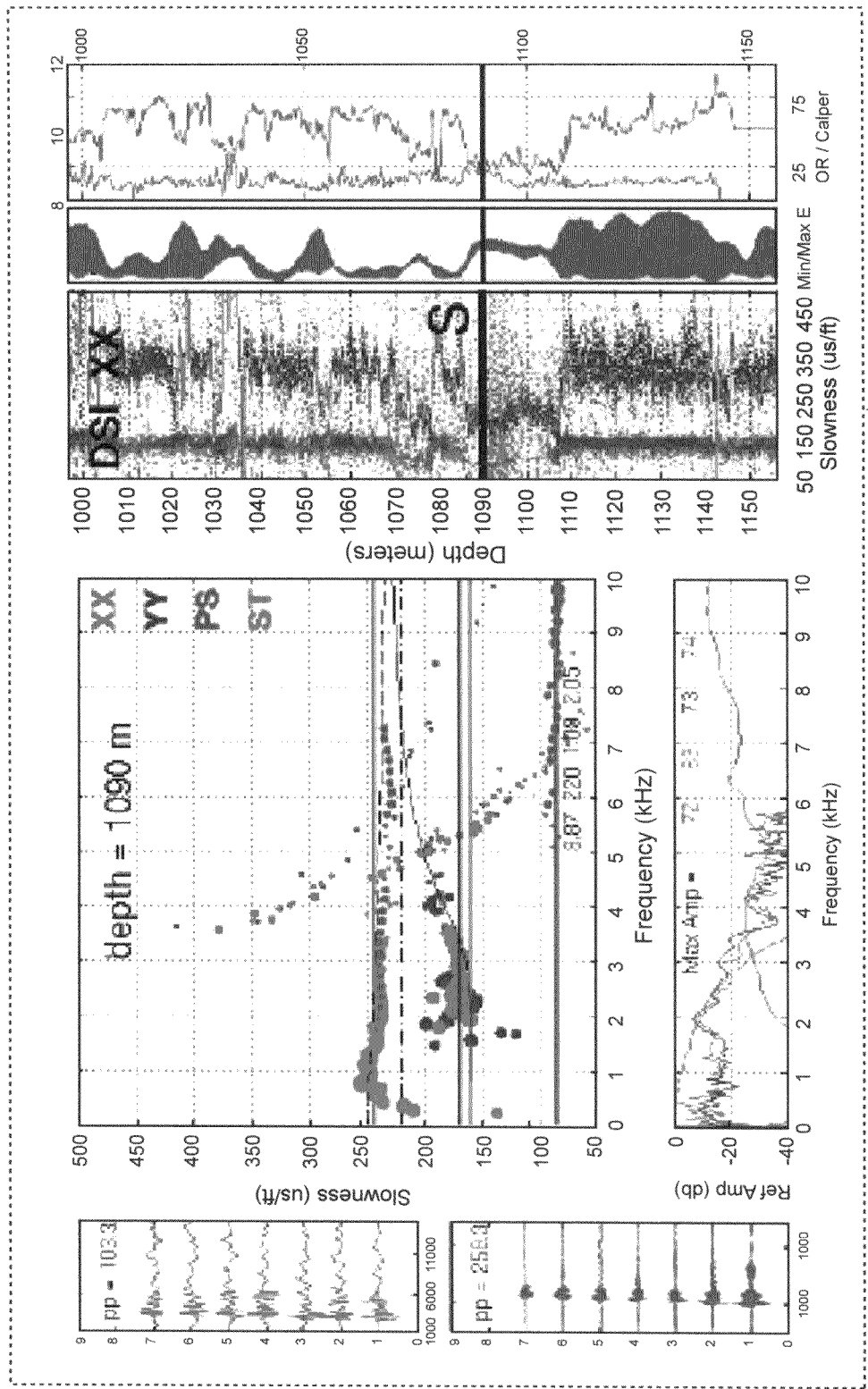
Figure 9C:
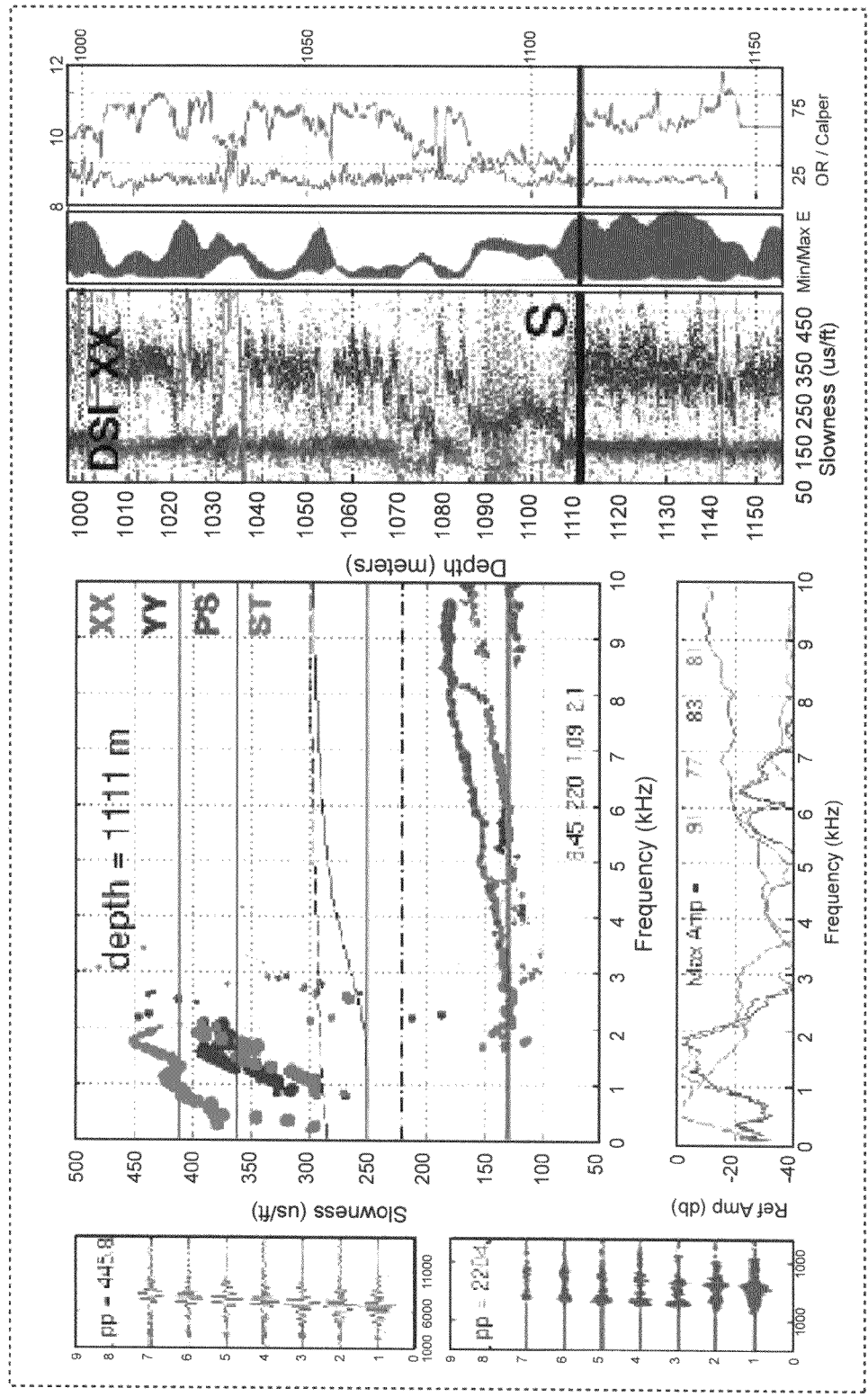

FIGS. 9A-9C illustrate an alternate embodiment of the display technique which may be used, for example, as part of a navigable or animated display of sonic logging data. In one implementation, such navigable or animated displays may be implemented using a computerized display system such as that described, for example, in FIG. 25 of the drawings.

FIG. 9A illustrates one frame 900 which may be generated as part of a navigable or animated SFA projection log display. As shown in the embodiment of FIG. 9A, frame 900 may include a plurality of different graphical displays including, for example, an SFA projection log portion 910, a dispersion curve portion 902, and/or desired auxiliary log portions (e.g., 904, 906, 908, 912, 914, etc.). In the embodiment of FIG. 9A, frame 900 represents a single frame corresponding to a particular depth (e.g., depth=1088.3 meters) of a navigable or animated SFA projection log display. The SFA projection log data for a selected depth interval is displayed at frame portion 910. Frame portion 910 may include a navigable pointer/selection mechanism (e.g., navigable line portion 911) which is configured or designed, for example, to allow a user to navigate within the SFA projection log display portion 910 in order to access additional sonic logging information for a selected depth. According to a specific implementation, the resulting display within frame 900 will include both log information (over a desired depth interval) and individual depth information relating to the selected depth. Alternatively, the pointer mechanism 911 may be configured or designed to automatically scroll through the SFA projection log display portion 910 in a manner which causes additional sonic logging information to be displayed in other portions of frame 900.

In the example of FIG. 9A, the position of the pointer mechanism 911 within the SFA projection log display portion 910 corresponds to a depth of 1088.3 meters. As a result, additional sonic logging information corresponding to the selected depth is displayed within other portions of frame 900. For example, dispersion curve data for depth=1088.3 meters is displayed at frame portion 902. According to a specific embodiment, the dispersion curve data may include different mode data such as, for example, fast (X) dipole shear, slow (Y) dipole shear, Stoneley (low frequency monopole) acquisition, compressional (high frequency monopole) acquisition, estimated slowness curves for desired modes, etc. Additionally, other sonic logging information for the selected depth (i.e., 1088.3 meters) may also be displayed. For example, frame portion 904 displays the received waveform data associated with the fast dipole source at the selected depth of 1088.3 meters; frame portion 906 displays the received waveform data associated with the high frequency monopole source at the selected depth of 1088.3 meters; frame portion 908 displays the spectral information of source waveforms (e.g., X dipole, Y dipole, high frequency monopole, low frequency monopole, etc.) at the selected depth of 1088.3 meters.

According to different embodiments, other types of log information may also be displayed within frame 900. For example, the SFA projection log portion 910 may display overlay information relating to one or more estimated slowness curves, such as, for example, estimated compressional slowness, estimated shear slowness, etc. As shown at frame portion 912, a log of the min-max crossline energy may be displayed for the entire depth interval. Additionally, as shown at 914, other log information may be displayed such as, for example, caliper log information (914b), gamma array log information (914a), etc.

In at least one implementation, sonic logging information relating to desired depths may be displayed by moving or navigating the pointer mechanism 911 within the SFA projection log display to select the desired depths. Thus, for example, as shown in FIG. 9A, when the position of the pointer mechanism 911 points at a depth of 1088.3 meters, additional sonic logging information relating to the selected depth of 1088.3 meters is displayed. Similarly, as shown in FIG. 9B, when the position of the pointer mechanism within the SFA projection log display points at a depth of 1090 meters, additional sonic logging information relating to the selected depth of 1090 meters is displayed within the frame 920. Likewise, as shown in FIG. 9C, when the position of the pointer mechanism within the SFA projection log display points at a depth of 1111 meters, additional sonic logging information relating to the selected depth of 1111 meters is displayed within the frame 930.

It will be appreciated that the information displayed within the frames illustrated in FIGS. 9A-9C represents one embodiment of the navigable display technique of the present disclosure. Alternate embodiments (not shown) may omit portions of information displayed in FIGS. 9A-9C, and/or may include additional display information not illustrated in FIGS. 9A-9C.

According to a specific embodiment, the pointer mechanism may be configured or designed to automatically navigate over the entire or selected portion of the SFA projection log display portion. In this way, an animation (i.e., a movie) of the sonic logging data may be displayed to the user. In at least one embodiment, such animation may combine many frames from many depths to give the viewer a clear understanding of the sonic data as well as auxiliary logs.

It will be appreciated that the navigable/animated display techniques of the present disclosure provide numerous benefits and advantages as compared to traditional sonic logging data display techniques. For example one benefit of the navigable/animated display techniques is that it allows for displays of continuous logs/images over large depth sections with auxiliary (input and/or processed) data. Another benefit is that it allows for effective evaluation of the global performance of the processing algorithm(s) applied to data acquired over large depths sections. Yet another benefit of the navigable/animated display techniques of the present disclosure is that it enables a user to assess or verify the quality (QC) of the input data and processing steps at desired depth levels. For example, by visually observing the quality (QC) of the input data and processing steps at desired depth levels, one is able to determine whether the cause of a detected anomaly in the output log is due, for example, to noisy waveforms, errors in data processing, or other factors.

Another benefit of the navigable/animated display techniques of the present disclosure is that it enables a user to check or verify the consistency of the processing results with auxiliary data at each depth level. For example, using the navigable/animated display techniques disclosed herein, one is able to compare the consistency of the alteration answers from monopole measurements with alteration indications from dipole measurements. An additional benefit of the navigable/animated display techniques is that it enables a user to identify corroborative features in the input, intermediate, and output data that may not have been anticipated (as opposed to those anticipated for which one checks their validity and consistency).

A further benefit of the navigable/animated display techniques of the present disclosure is that it enables a user to recognize features associated with strong variation(s) in the slowness (e.g., layering effects), as well as their manifestations in the input data and output logs. This often-ignored aspect is valuable not only in the interpretation of the logs but also in identifying the limits of the sonic logging measurements (e.g., too large a receiver array to resolve fine layering).

In addition to the benefits and advantages described above, the navigable/animated display techniques disclosed herein also provide the benefit of enabling a user to perform visual comparisons between competing sonic logging data processing algorithms over large depth sections. Additionally, the navigable/animated display techniques herein provide the benefit of enabling a user to learning how to interpret the sonic logging data logs, for example, by allowing the user to observe, simultaneously with the displayed log data, depth specific acquired waveforms and their respective dispersion curve information and/or other depth specific sonic logging information which was used to generate portions of the log data being displayed.

Figure 10:
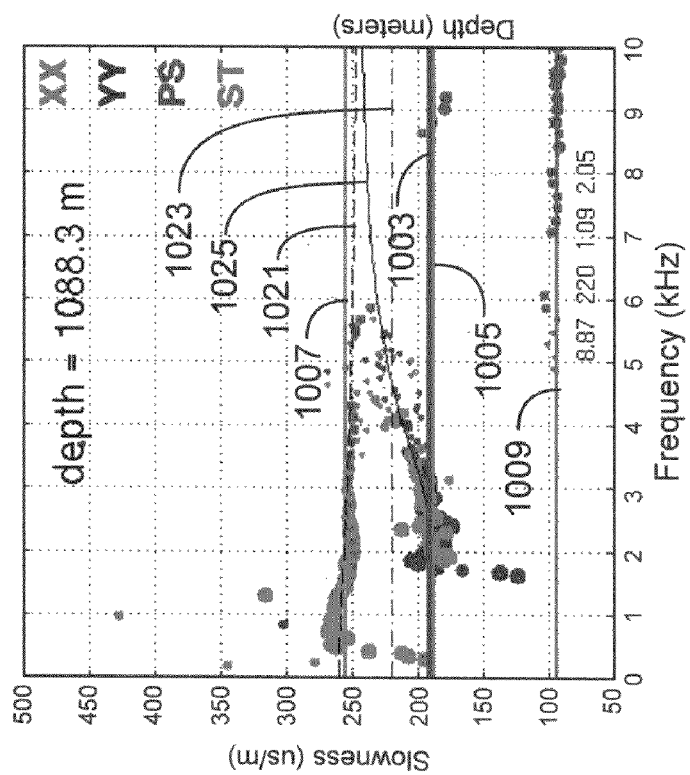
FIG. 10 shows an example of the dispersion curve display 1000 in accordance with one embodiment of the present disclosure.

FIG. 10 shows an example of the dispersion curve display 1000 in accordance with another embodiment of the present disclosure. In this example, a plot is displayed of selected dispersion curve data generated from a wireline sonic logging tool at a selected depth (e.g., depth=1088.3 meters). As illustrated in FIG. 10, the display of dispersion curves includes a plurality of solid curves (or lines) which represent the estimated slowness (e.g., from semblance based processing) at the low-frequency limit for selected acquisition modes (e.g. fast dipole shear 1003, slow dipole shear 1005, low frequency monopole 1007, high frequency monopole 1009, etc.).

Additionally, according to at least one embodiment, the dispersion curve display may also include theoretical dispersion curve information. In the example of FIG. 10, the displayed theoretical dispersion curves include a solid black curve 1025 representing a model calculation for the dipole flexural wave; a dashed black curving line 1021 representing a model calculation for the monopole Stoneley wave, and a substantially horizontal dashed black line 1023 representing the theoretical slowness of the borehole mud. It will be appreciated that the dispersion curve display of FIG. 10 enables one to visually determine whether (or not) the estimated slownesses curves are consistent with the actual dispersion curve data (dots). In addition, the dispersion curve display of FIG. 10 also enables one to visually determine whether (or not) the dispersion curve data are consistent with the homogeneous, isotropic model(s).

Figure 11:
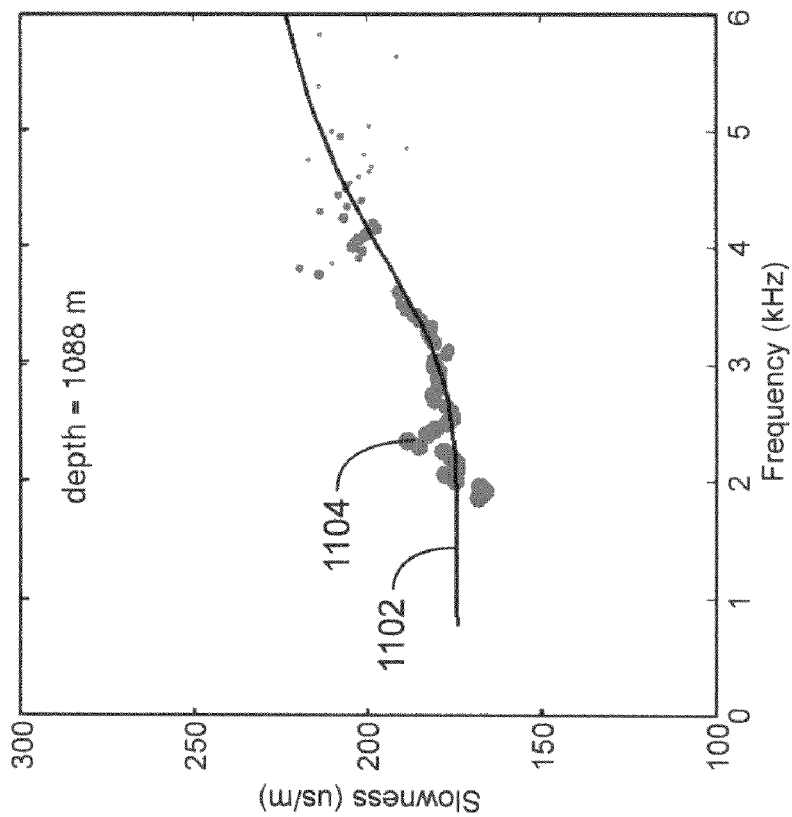
FIG. 11 shows a displayed dispersion curve 1100 according to one embodiment of the present disclosure.

In the examples illustrated in the preceding Figures, the SFA projection logs were derived from estimations of dispersion curve data generated from a set of individual data points (or dots). However, it will be appreciated that, in alternate embodiments it is possible to generate dispersion curves which are represented as a continuous curve, rather than a grouping of dots or data points. One such embodiment is illustrated, for example, in FIG. 11. FIG. 11 shows a dispersion curve 1100 according to one embodiment of the present disclosure, wherein a first portion of the dispersion curve is represented by data points 1104, and wherein a second portion of the dispersion curve is represented by a continuous curve 1102. It will be appreciated that estimated slowness data may be generated using either type of dispersion curve (either "dots" or "curves"), and therefore that SFA projection logs may also be generated using either type of dispersion curve.

Figure 12:
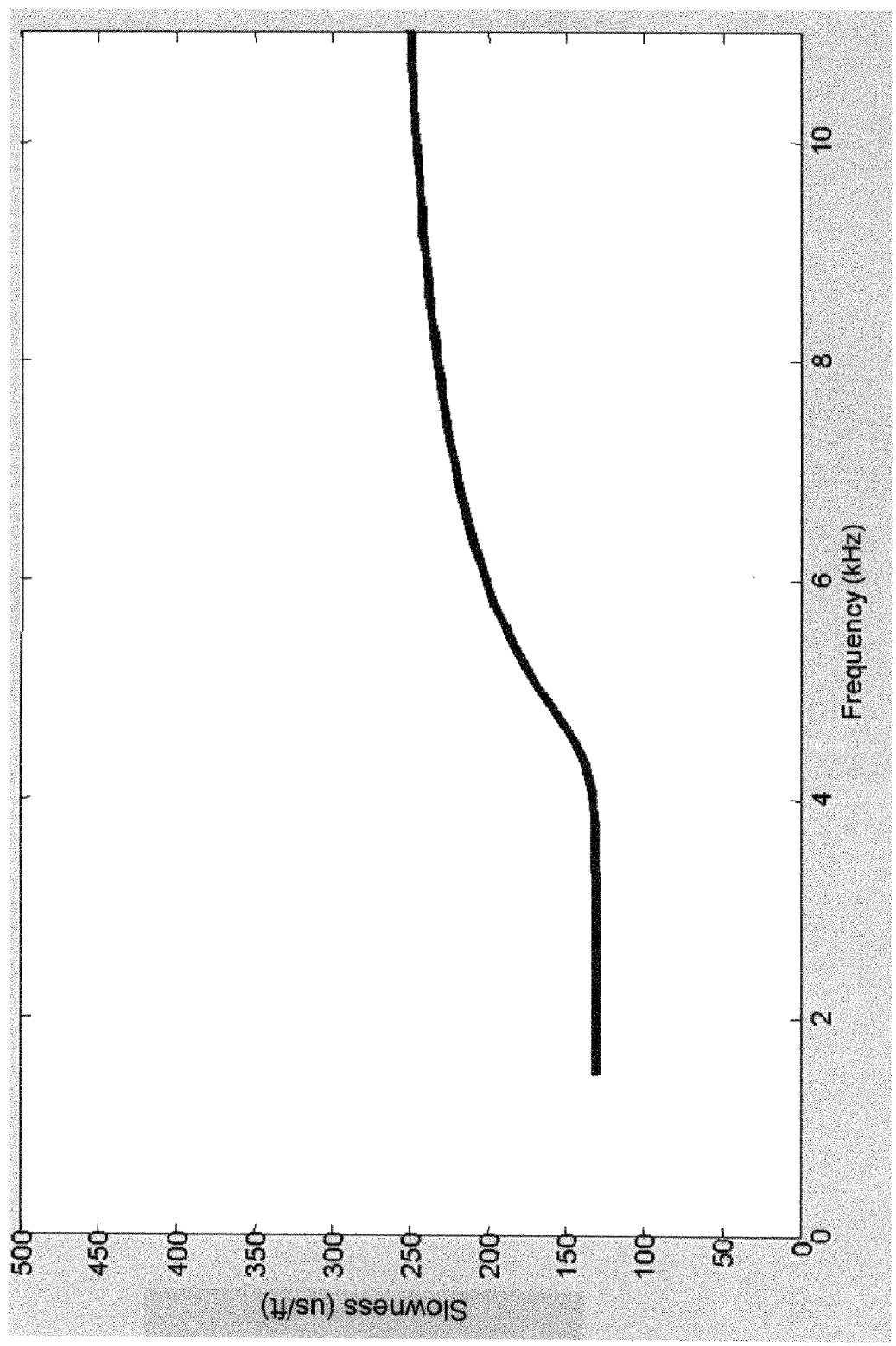
FIG. 12 shows a dispersion curve of modeled dipole flexural wave data showing slowness as a function of frequencies for one depth.

FIG. 12 shows a dispersion curve of modeled dipole flexural wave data showing slowness as a function of frequencies for one depth. The low frequency limit of the dispersion curve is the correct formation shear slowness.

Figure 13:
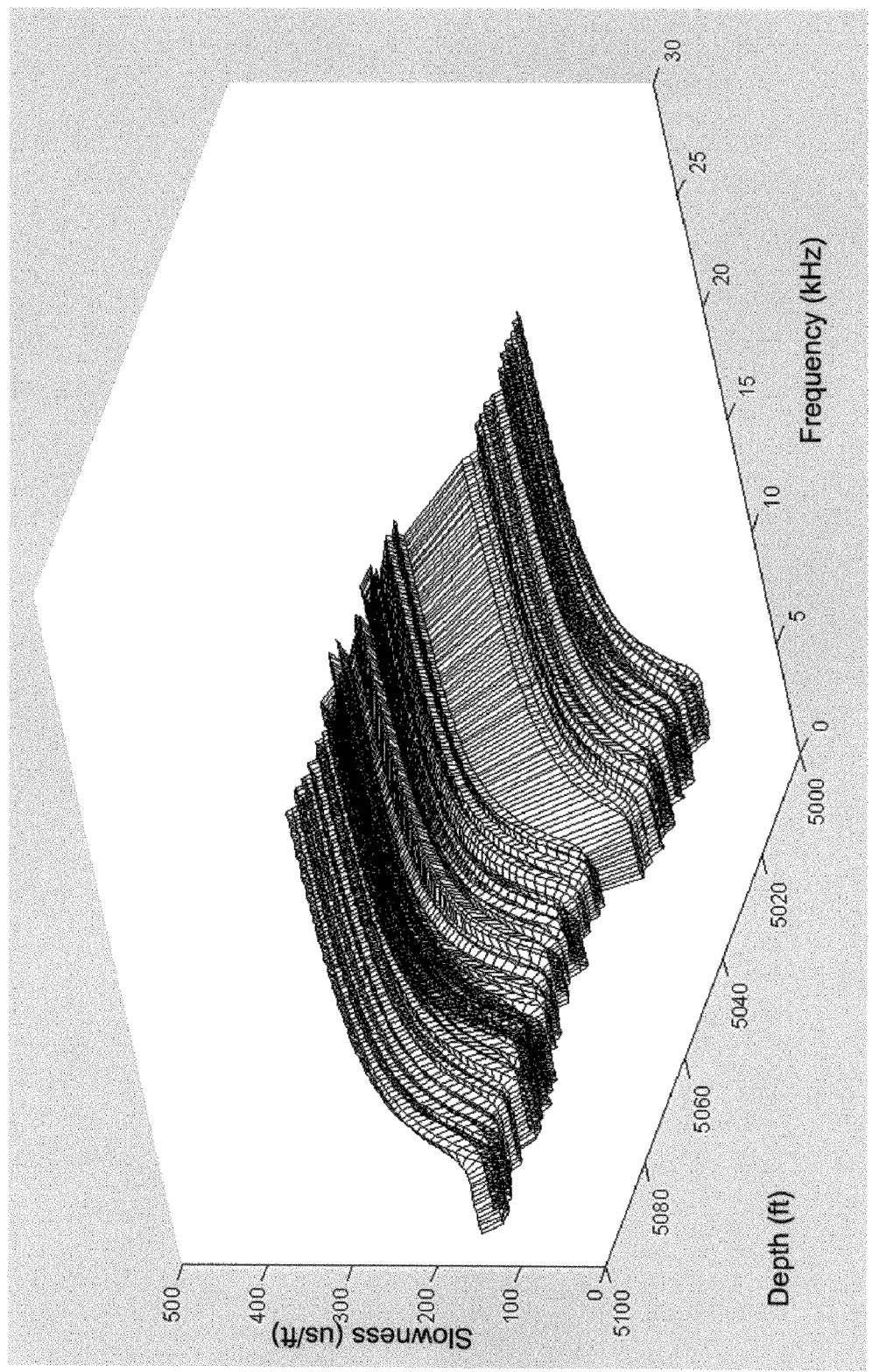
FIG. 13 shows a 3D plot of modeled dispersion curves versus depth with slowness-frequency-depth axes.

FIG. 13 shows a 3D display of modeled dipole flexural dispersion curves versus depth with slowness-frequency-depth axes. In this example, the depths range from 5000 ft to 5100 ft. The frequencies range from 0-25 kHz. There is a different modeled dipole flexural dispersion curve for each depth. The low-frequency limits of the dipole dispersion curves range from 90-160 microsec/ft. The lines that connect the individual dispersion curves are lines that are linked by a constant frequency. This 3D plot shows the behavior of the entire data set.

Figure 14:
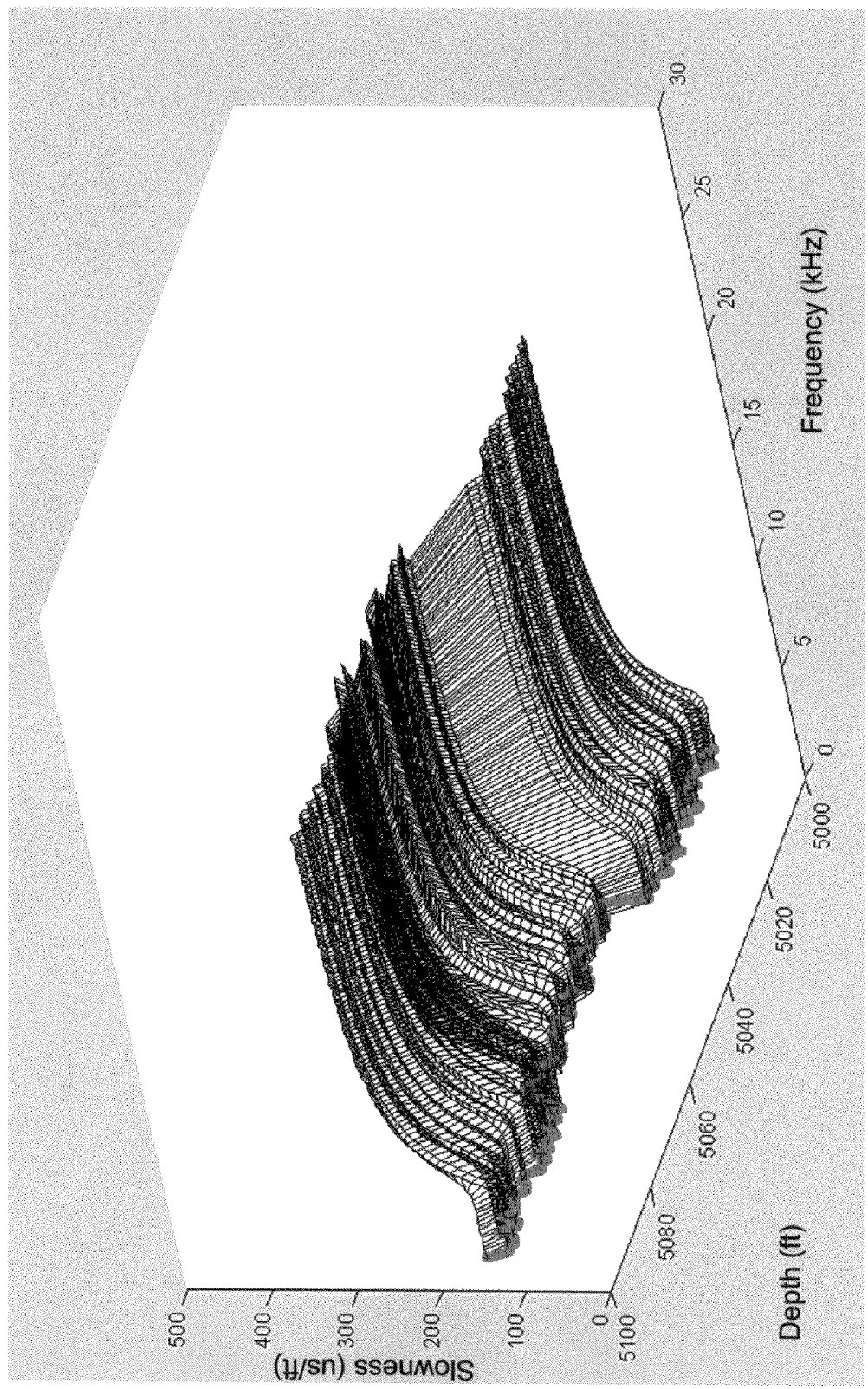
FIG. 14 shows the 3D plot of modeled dispersion curves of FIG. 13 with estimated formation slowness overlaid.

FIG. 14 shows the 3D display of modeled dipole flexural dispersion curves of FIG. 13 with the estimated formation slowness curve versus depth overlaid. The red line overlay of the formation shear slowness indicates that the estimated slowness is the correct low frequency limit of the dipole dispersion curve. The low frequency limit of the dispersion curve is the correct formation shear slowness.

Figure 15:
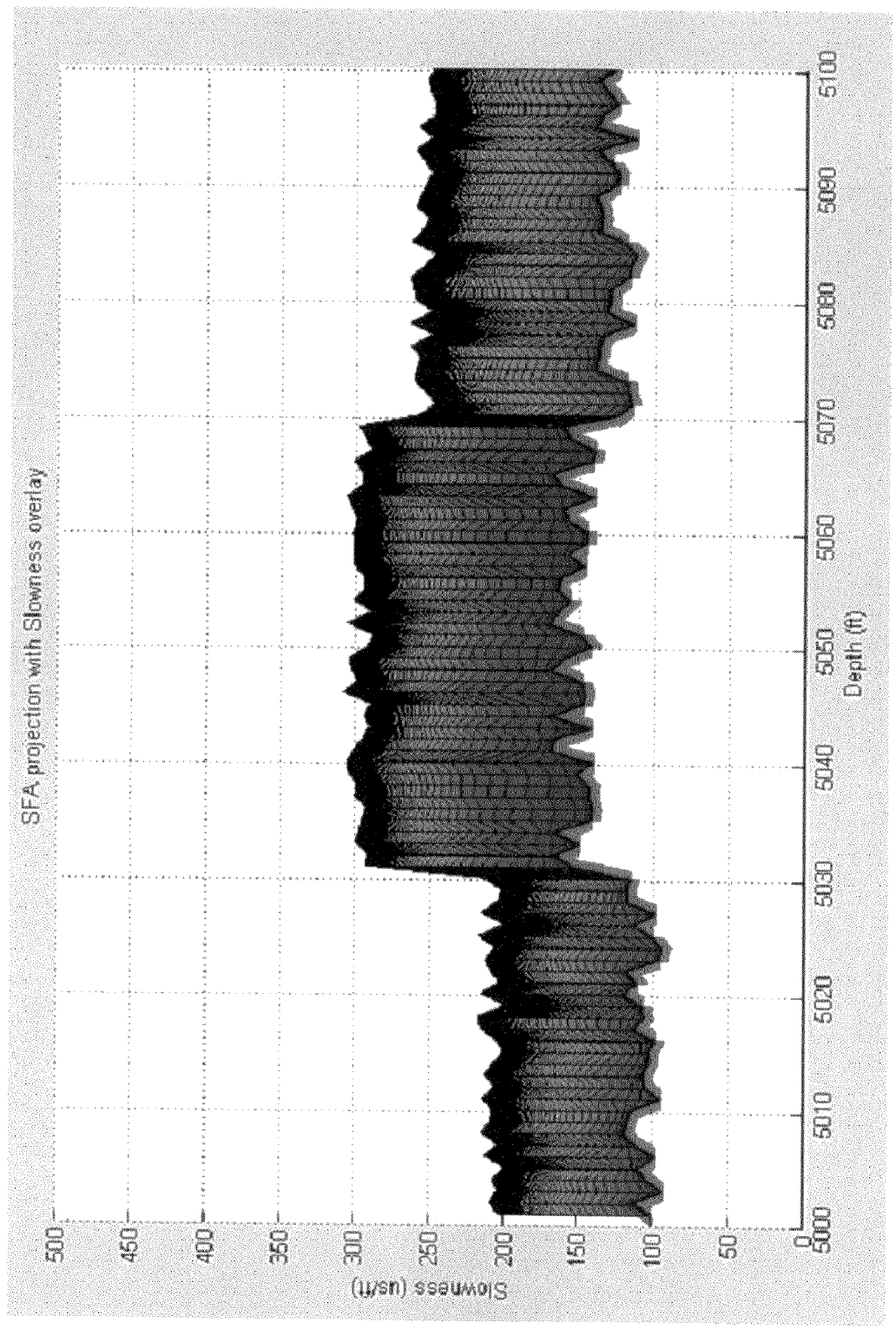
FIG. 15 shows a display of FIG. 14 projected onto slowness-depth axes.

FIG. 15 shows a display of the modeled dipole flexural dispersion curves of FIG. 14 projected onto slowness-depth plane. This figure is similar to the SFA projection in FIG. 6B. In the SFA projection log display of FIG. 15, the estimated formation shear slowness versus depth is overlaid, and one observes that, over the entire depth interval, the estimated shear slowness log values (red line) lie at or relatively near the lower edge (i.e., bottom edge) of the dipole flexural slowness band. Based upon this visual observation, one having ordinary skill in the art would be able to perform a visual QC analysis to verify that the SFA projection log of FIG. 15 (including the estimated shear slowness data) is relatively accurate and/or of good quality. The width of the band of the projection at any depth gives a qualitative indication of formation near-wellbore alteration.

Figure 16:
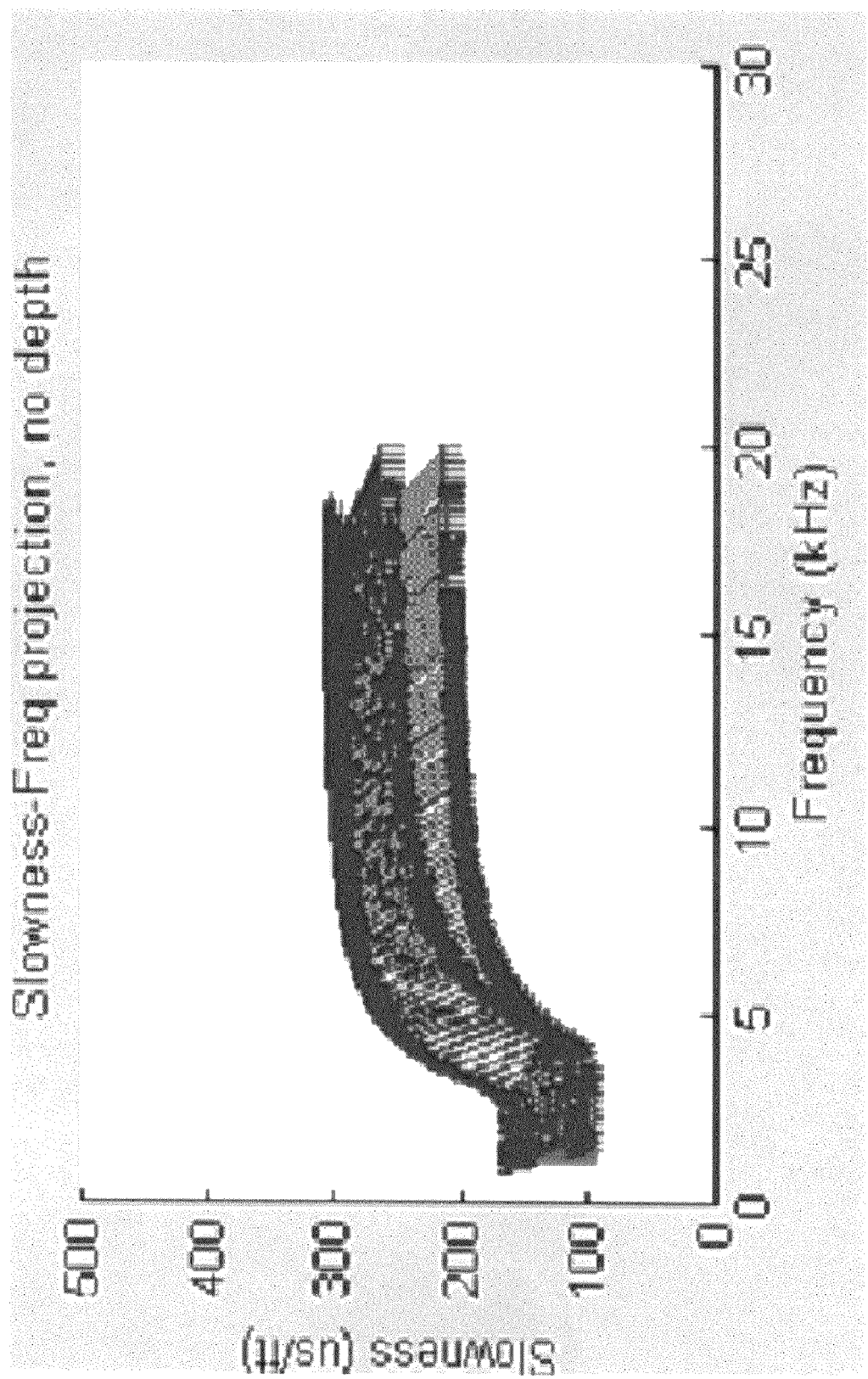
FIG. 16 shows a display of 2D line plots of dispersion curves projected onto slowness-frequency axes.

FIG. 16 shows 2D line displays of dispersion curves projected onto slowness-frequency plane. This is an alternative view of the 3D data. One observes that some dispersion curves are much steeper than others. This is a qualitative indicator of formation near-wellbore alteration.

Figure 17:
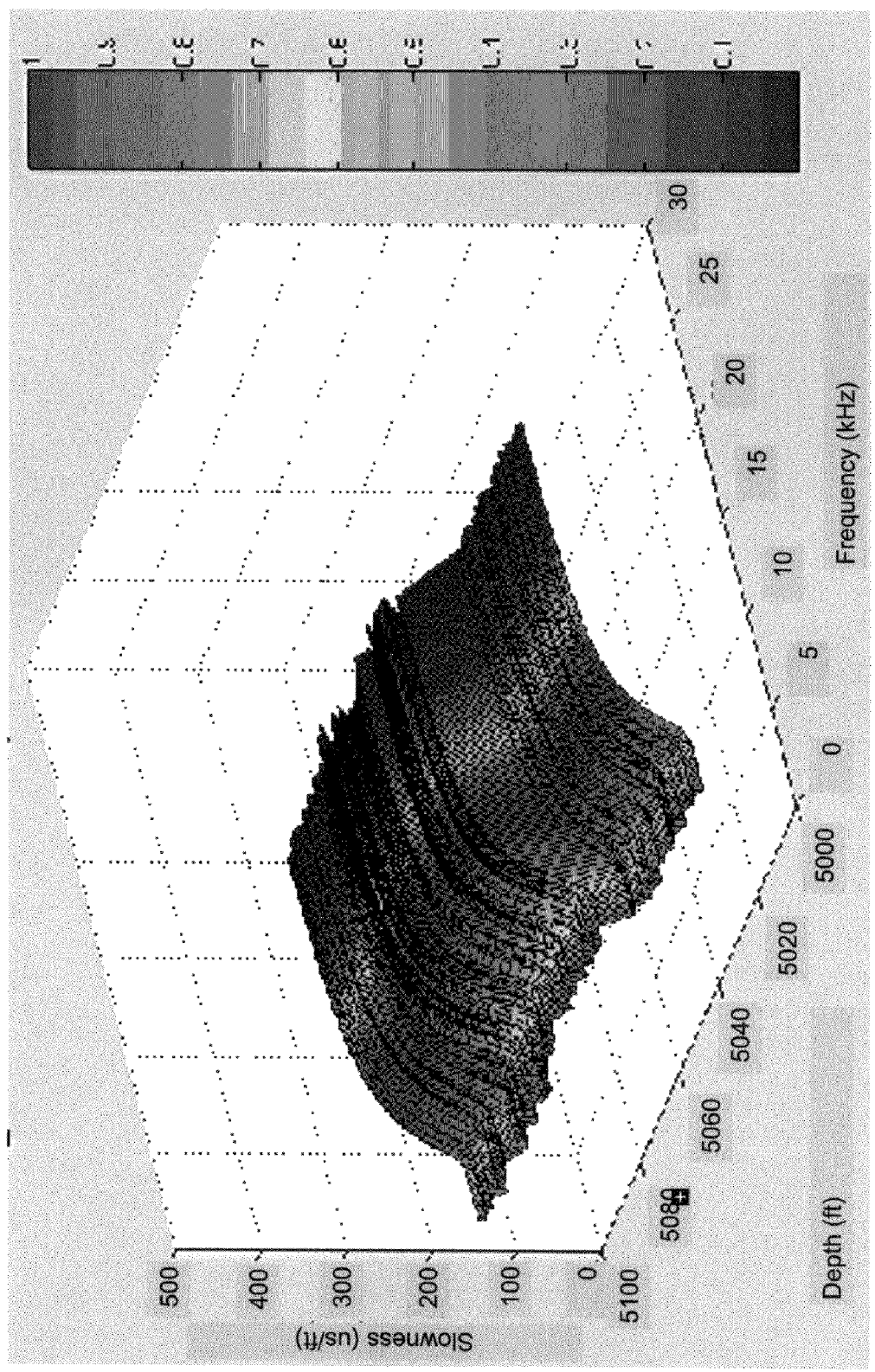
FIG. 17 shows the 3D display of FIG. 13 with amplitude attribute associated with the dispersion curve for every frequency.

FIG. 17 shows the 3D display of FIG. 13 with a color-coded amplitude attribute assigned to every frequency of each individual dispersion curve from each depth. This is one of several possible attributes that could be assigned to each frequency. The high amplitude portion (in red) tends to occur in the medium frequency range in this example. The amplitude attribute is a useful indicator of borehole size changes, near-wellbore alteration, and other wave propagation effects.

Figure 18:
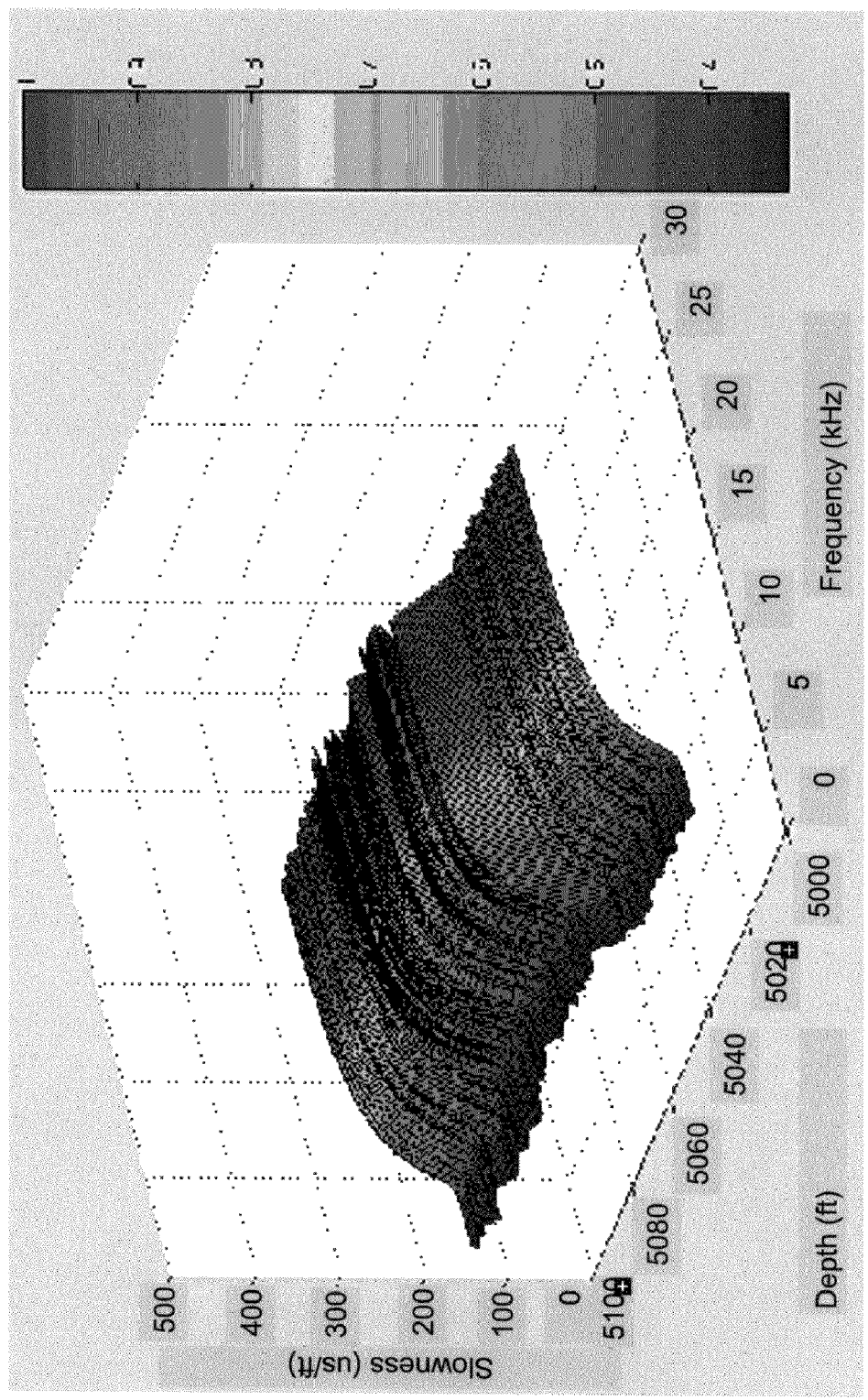
FIG. 18 shows the 3D plot of modeled dispersion curves of FIG. 13 with attenuation attribute.

FIG. 18 shows the 3D display of modeled dispersion curves of FIG. 13 with a color-coded attenuation attribute assigned to every frequency of each individual dispersion curve from each depth. The highest attenuation portion (in red) tends to occur in the high frequency range in this example. Changes in the frequency location of the high attenuation portion may be an indicator of hydrocarbon saturation. This display would show variations that are also related to different formation rock types (limestone, sandstone, shales, etc.).

Figure 19:
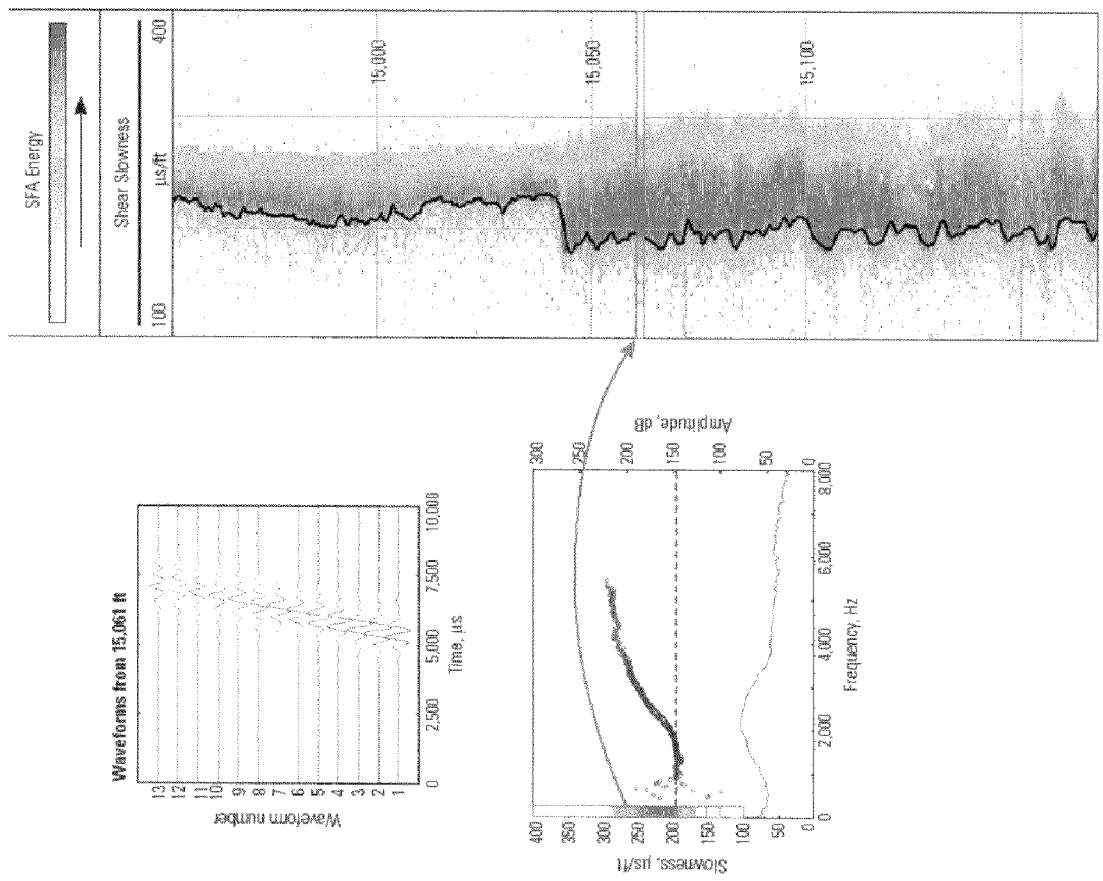
FIG. 19 shows one embodiment of a method for displaying sonic logging information.

FIG. 19 shows one embodiment of a method for displaying sonic logging information. In the case of construction of a slowness-frequency-analysis (SFA) log for controlling the quality of shear-slowness estimation from flexural waves, dipole flexural waveforms at each depth (the top left of FIG. 19) are analyzed for their slowness at varying frequencies. Resulting data are plotted on a slowness-frequency plot (the bottom left of FIG. 19), with circle size indicating amount of energy. Although circles have been used in FIG. 19, other symbols such as asterisks, plus signs, squares or rectangular shapes, stars, dots, among other commonly used symbols, may be used for the purposes described herein. In this, the sizes of the symbols may be varied to indicate the quantitative values of the attribute. Moreover, various symbols may be used in combination to display the quantitative values of the attributes. Energies are color-coded and projected onto the slowness axis. The color strip is plotted at the appropriate depth to create a log (the right of FIG. 19). The slowness estimate from dispersive STC processing is plotted as a black curve. If this matches the zero-frequency limit of the SFA projection, the slowness estimate is good. This figure is similar to FIGS. 4A-4C.

Figure 20:
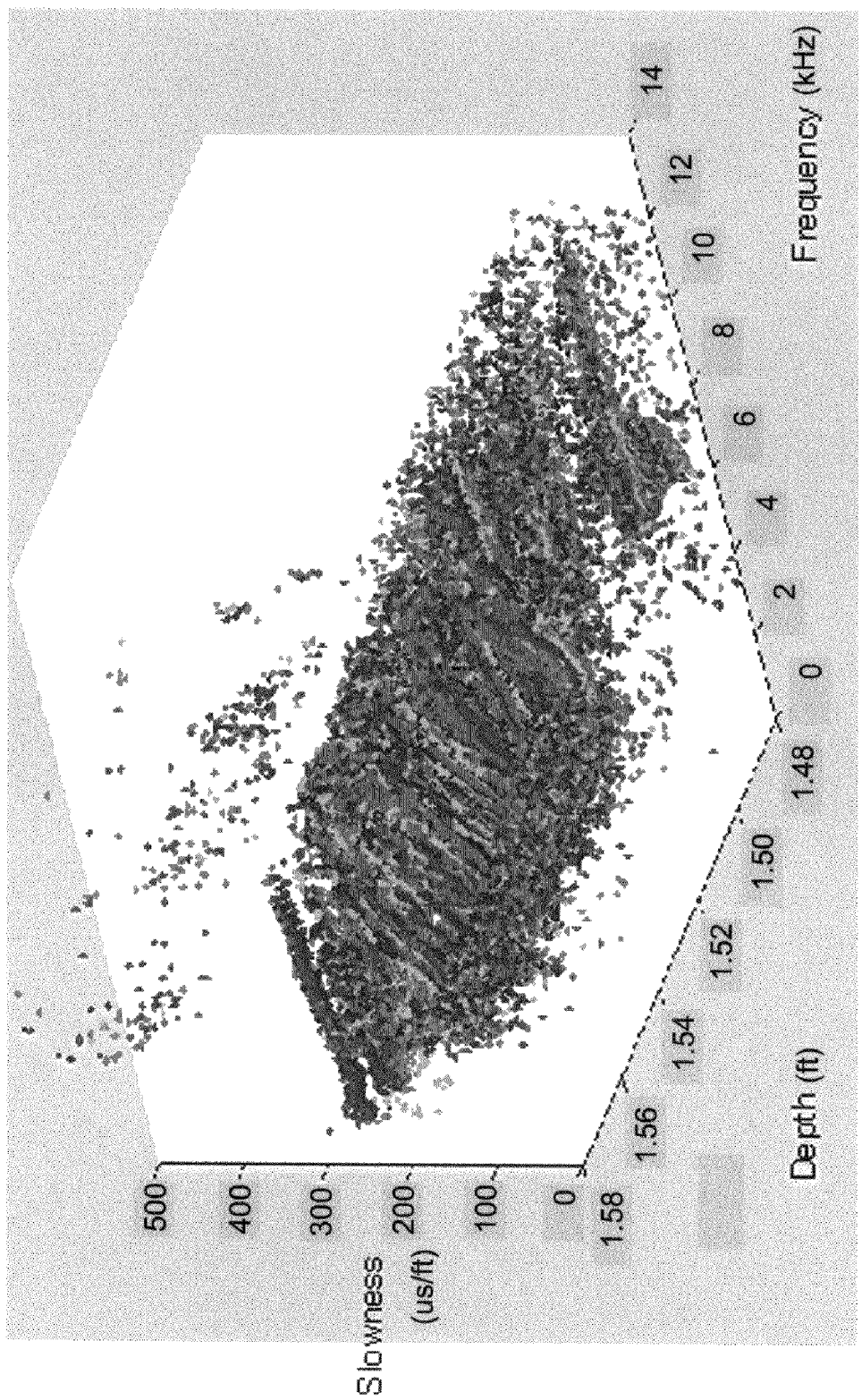
FIG. 20 shows a 3D plot of dispersion curves versus slowness, frequency and depth.

FIG. 20 shows a 3D display of dispersion curves versus slowness, frequency and depth. This is real field data including a degree of noise which makes the data less continuous as compared to the modeled data in FIG. 13. This figure also uses the dot display (as described in FIG. 11). The dispersion curve at each depth has a different set of colored dots.

Figure 21:
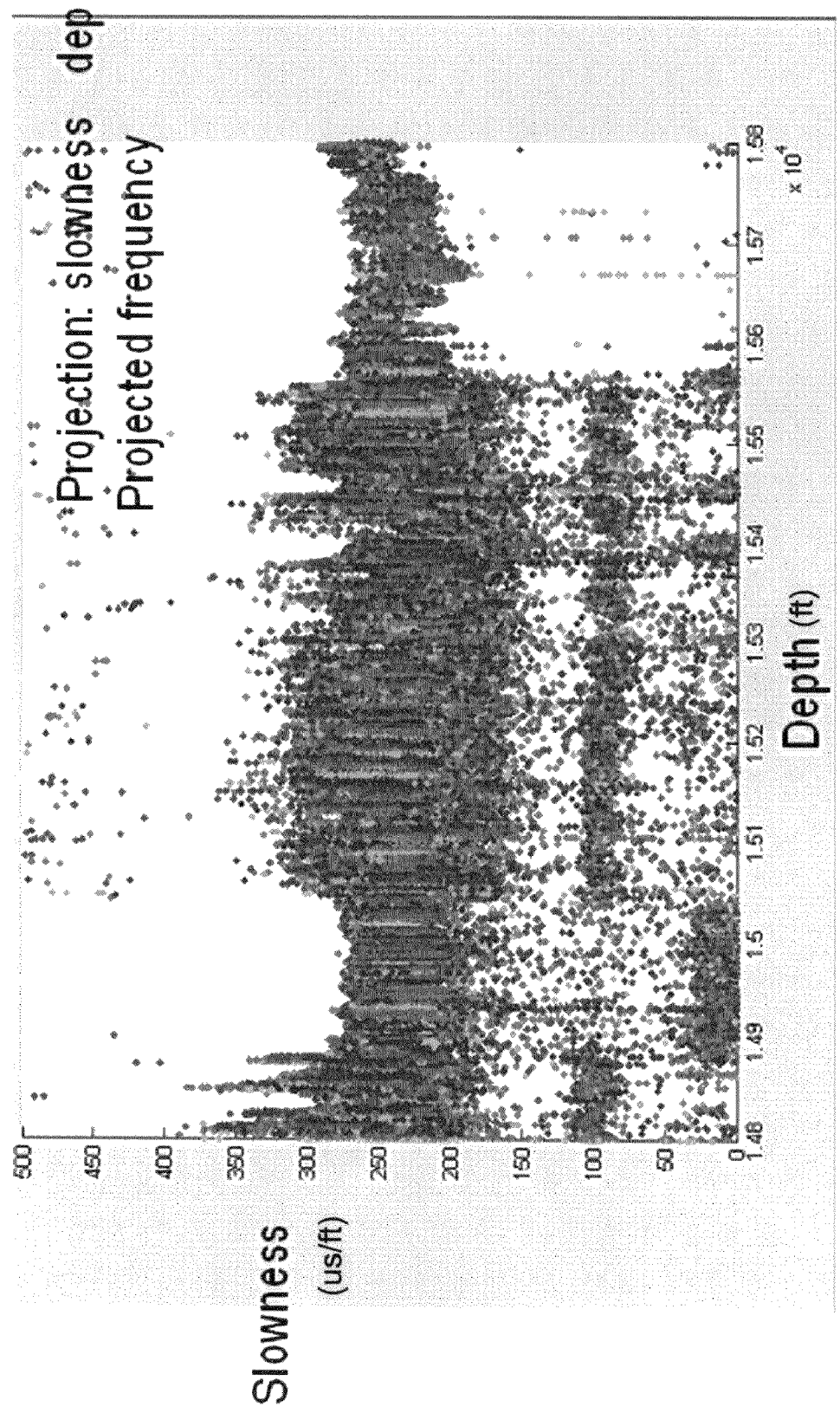
FIG. 21 shows 2D line plots of dispersion curves projected onto slowness-depth axes.

FIG. 21 shows 2D line displays of dispersion curves of the real field data from FIG. 20 projected onto slowness-depth axes. This figure uses the dot display (as described in FIG. 11). The band of dots between slowness of 200-300 microsec/ft is the dipole flexural data. There is a wide band of dots near 15200 ft and a narrow band of dots near 15700 ft. The band of dots near a slowness of 100 microsec/ft is the compressional signal generated by the dipole. The lack of compressional dots near 15700 ft is also an indicator of a different formation rock-type. Thus, this display indicates both the shear and the compressional signals and difference in rock types. This display is also related to the SFA projection described in FIG. 19.

Figure 22:
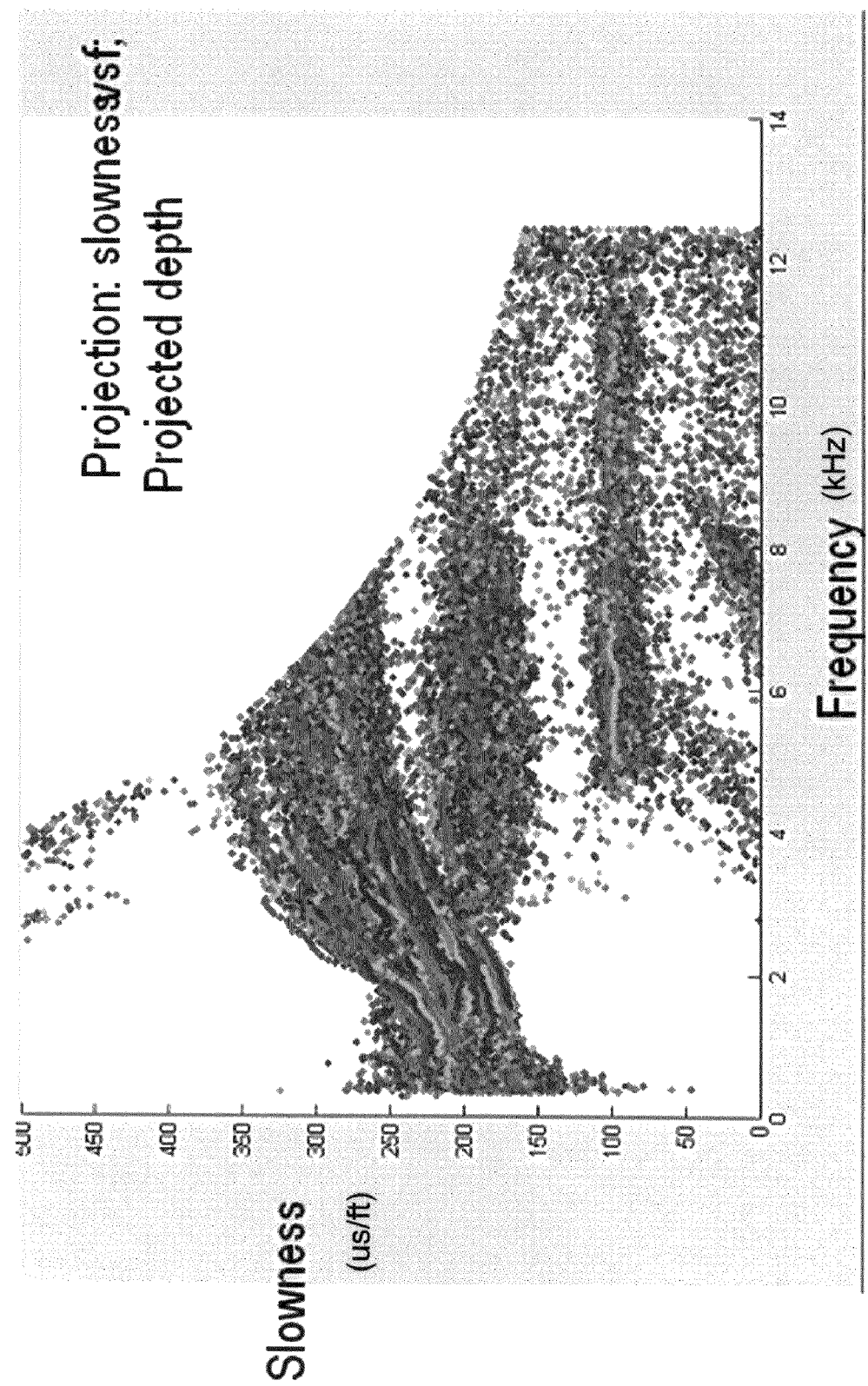
FIG. 22 shows 2D line plots of dispersion curves projected onto slowness-frequency axes.

FIG. 22 shows 2D line displays of dispersion curves of real field data from FIG. 20 projected onto slowness-frequency plane. In this display, one can identify that there are the dipole flexural dispersions on the top left of FIG. 22, that horizontal data near a slowness of 200 microsec/ft in FIG. 22 are the shear headwave signals, and that horizontal data near a slowness of 100 microsec/ft in FIG. 22 are the dipole compressional signals.

Figure 23:
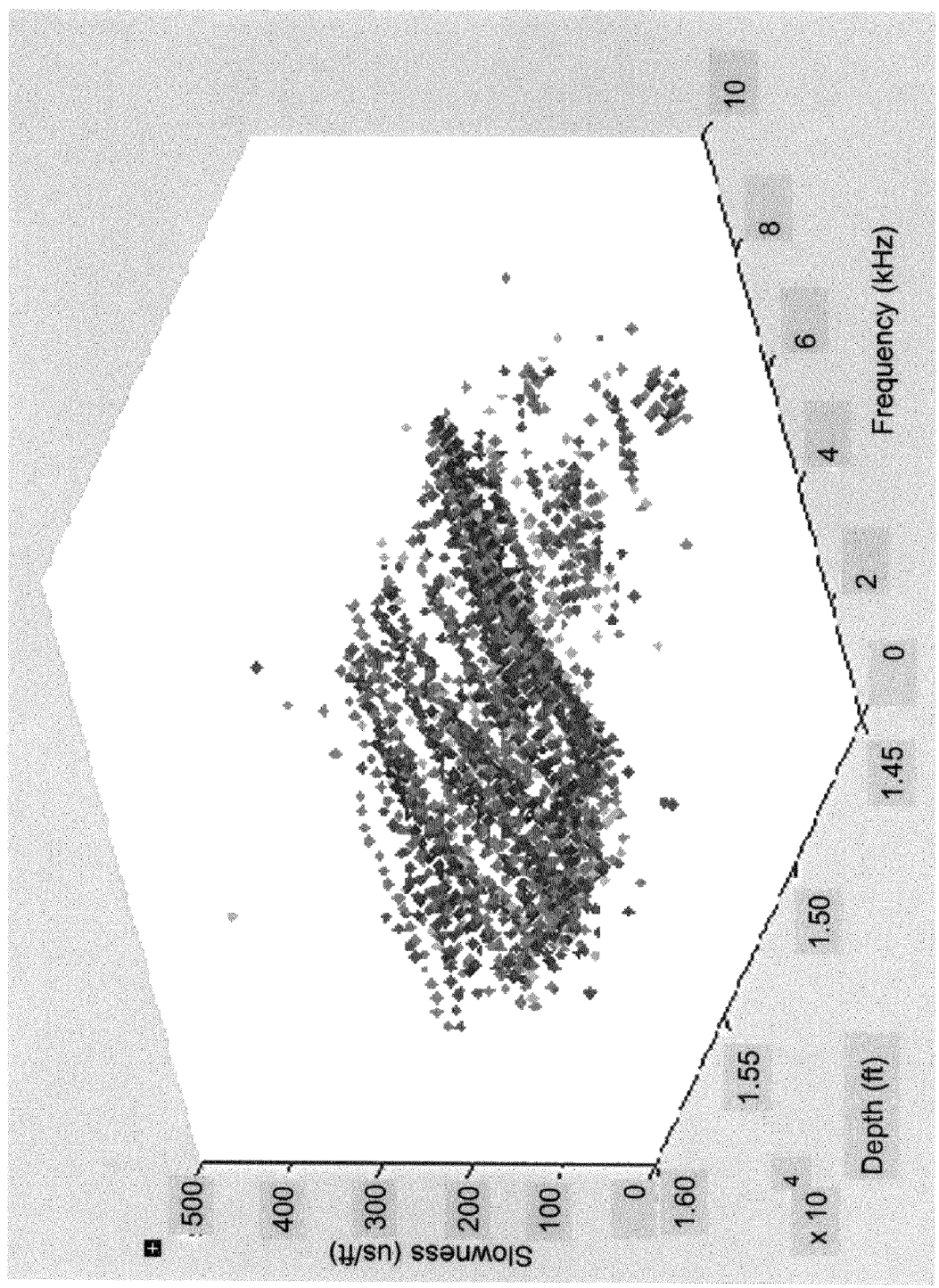
FIG. 23 shows a 3D plot of modeled dispersion curves versus depth with slowness-frequency-depth axes, the 3D display being provided with a different color scale.

FIG. 23 shows a 3D display of modeled dispersion curves versus depth with slowness-frequency-depth axes. In this, the 3D plot is provided with a color scale similar to FIG. 20. The dispersion curve at each depth has a different set of colored dots.

Figure 24:
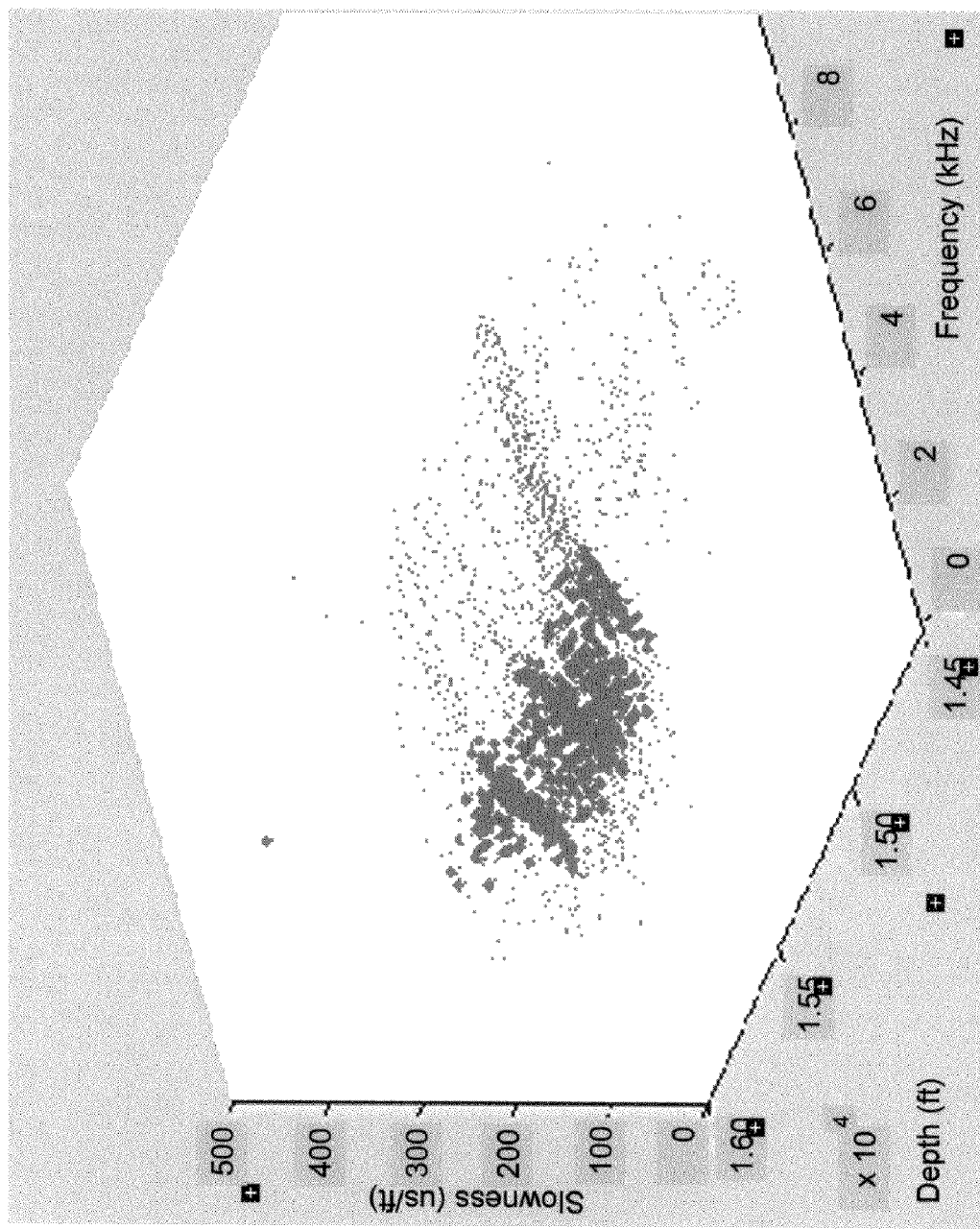
FIG. 24 shows a 3D plot of modeled dispersion curves versus depth with slowness-frequency-depth axes, the 3D display being provided with yet another color scale.

FIG. 24 shows a 3D display of the modeled dispersion curves of FIG. 23 versus depth with slowness-frequency-depth axes. In this, the 3D plot is provided with color scale weighted by an amplitude attribute. In this case, all the dots (at each frequency) have the same color (red) but the amplitude attribute is indicated by the size of the dot. In this case, the major portion of the amplitude is in the middle frequency range.

It will be appreciated that the various aspects described herein may be applied to a variety of different sonic logging data sources such as, for example, dipole sources, monopole sources, quadrupole sources, etc. Additionally, it will be appreciated that the various aspects described herein may be used to generate alternative embodiments wherein the information displayed relates to any desired combination of sonic logging units such as, for example, slowness v. frequency, velocity v. frequency, slowness v. period, velocity v. period, etc.

Generally, the display techniques disclosed herein may be implemented on software and/or hardware. For example, they can be implemented in an operating system kernel, in a separate user process, in a library package bound into network applications, on a specially constructed machine, or on a network interface card. In one embodiment herein, the techniques of the present disclosure may be implemented in software such as an operating system or in an application running on an operating system.

A software or software/hardware hybrid implementation of the display techniques may be implemented on a general-purpose programmable machine selectively activated or reconfigured by a computer program stored in memory. Such programmable machine may be implemented on a general-purpose network host machine such as a personal computer or workstation. Further, the techniques herein may be at least partially implemented on a card (e.g., an interface card) for a network device or a general-purpose computing device.

Figure 25:
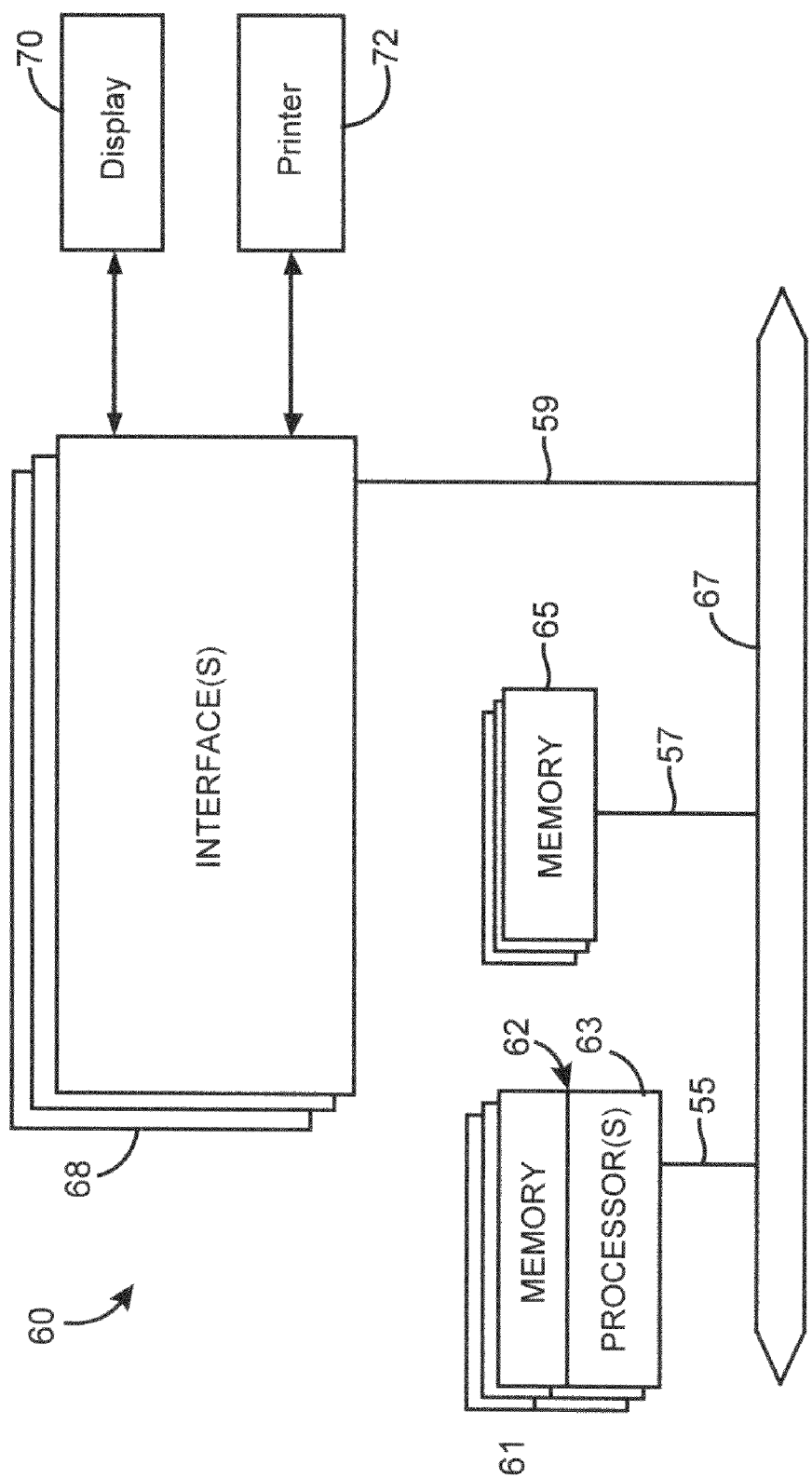
FIG. 25 shows a network device 60 suitable for implementing various aspects of the display techniques of the present disclosure.

Referring now to FIG. 25, a network device 60 suitable for implementing various aspects of the display techniques of the present disclosure includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a general-purpose computing device, the CPU 62 may be responsible for data processing, media management, I/O communication, rendering and display of data, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60, such as, for example, display devices 70 and/or printing devices 72. It will be appreciated that the various display techniques and/or graphical displays herein may be presented for display on electronic display devices and/or non-electronic display devices (such as, for example, printed for display on paper).

Examples of other types of interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may be used, for example, to handle data processing tasks, display tasks, communication tasks, media control tasks, etc.

Although the system shown in FIG. 25 illustrates one specific network device, it is by no means the only network device architecture on which the present disclosure can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the display techniques described herein. The program instructions may control the operation of an operating system and/or one or more applications, for example. The memory or memories may also be configured to store data structures, sonic logging information, user preference information, system configuration information, display configuration information, and/or other specific non-program information described herein.

Because such information and program instructions may be employed to implement the systems/methods described herein, the present disclosure relates to machine readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The techniques herein may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

According to specific embodiments, the techniques of the present disclosure may be implemented using well-known, conventional platforms such as, for example, HTML, XML, Java, JavaScript and DHTML. In a specific embodiment, the techniques may be implemented on a server system which is accessible by computer network users.

Although several embodiments have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for displaying sonic logging data associated with an earth formation surrounding a borehole in which a sonic tool with a receiver is placed, the method comprising:
   acquiring sonic data at a plurality of depths in the borehole by using the receiver;
   processing the acquired sonic data to generate slowness-versus-frequency dispersion curve for each depth;
   projecting the slowness-versus-frequency dispersion curve versus depth onto the slowness-depth plane, wherein the projected dispersion curve has a band in a direction of the depths;
   displaying the projected dispersion curve on the slowness-versus-depth plane, whereby a width of the band indicates at least one of a near-wellbore alternation, compressional and shear signal information, and difference in rock types of the earth formation.

2. The method of claim 1 wherein the displayed dispersion curve illustrates homogeneous and inhomogeneous characteristics of the formation.

3. The method of claim 1 wherein the displayed dispersion curve illustrates isotropic and anisotropic characteristics of the formation.

4. The method of claim 1 wherein the dispersion curve is displayed in one dimension.

5. The method of claim 1 wherein the displayed dispersion curve includes dipole flexural information which has been projected onto a slowness axis.

6. The method of claim 1 wherein the displayed dispersion curve includes dipole compressional information which has been projected onto a slowness axis.

7. The method of claim 1 wherein the acquired sonic data corresponds to sonic logging data generated by at least one source selected from the group consisting of: a dipole source, a monopole sources, and a quadrupole source.

8. The method of claim 1 wherein the acquired sonic data corresponds to sonic logging data selected from the group consisting of: fast dipole shear data, slow dipole shear data, low-frequency monopole data, and high frequency monopole data.

9. The method of claim 1 further comprising:
   displaying an overlay of estimated wave slowness information onto the displayed dispersion curve.

10. The method of claim 9 wherein the estimated wave slowness information includes information from the group consisting of: fast estimated shear wave slowness, estimated compressional wave slowness, estimated Stoneley wave slowness.

11. The method of claim 1 wherein the display further comprises a navigable mechanism configured or designed to link the display to additional logging information associated with selected depths.

12. The method of claim 11 wherein the display further includes depth specific sonic logging information relating to a depth selected by the navigable mechanism.

13. The method of claim 11 wherein the navigable mechanism is further configured or designed to automatically scroll through the display in a manner which causes additional depth specific sonic logging information to be automatically displayed.

14. The method of claim 1 wherein the display further comprises a navigable mechanism configured or designed to link the display to depth specific logging information associated with selected depths; and
wherein the display further includes depth specific display information relating to selected characteristics of the depth specific logging information.

15. The method of claim 14 wherein the depth specific display information is displayed concurrently with the dispersion curve for each depth.

16. A system for displaying sonic logging data associated with an earth formation surrounding a borehole, the system comprising:
means for acquiring sonic data at a plurality of depths in a borehole;
means for processing the acquired sonic data to generate a slowness-versus-frequency dispersion curve for each depth;
means for projecting the slowness-versus-frequency dispersion curve versus depth onto the slowness-depth plane, wherein the projected dispersion curve has a band in a direction of the depths;
means for displaying the projected dispersion curve on the slowness-versus-depth plane, whereby a width of the band indicates at least one of a near-wellbore alteration, compressional and shear signal information, and difference in rock types of the earth formation.

17. A system for displaying sonic logging data associated with an earth formation surrounding a borehole, the system comprising:
a receiver configured or designed to acquire sonic data at a plurality of depths in a borehole;
a processor configured or designed to process the acquired sonic data to generate a slowness-versus-frequency dispersion curve for each depth;
the processor being further configured or designed to project the slowness-versus-frequency dispersion curve versus depth onto the slowness-depth plane;
a display associated with the processor and configured or designed to display the projected dispersion curve on the slowness-versus-depth plane.

18. The system of claim 17 further comprising memory.

19. The system of claim 17 wherein the processor comprises a computer.

20. The system of claim 17 further comprising at least one source selected from the group consisting of: a dipole source, a monopole source, and a quadrupole source.

21. The system of claim 17 wherein the acquired sonic data corresponds to sonic logging data selected from the group consisting of: fast dipole shear data, slow dipole shear data, low-frequency monopole data, and high frequency monopole data.

22. The system of claim 17 further comprising a navigable mechanism configured or designed to link the display to additional sonic logging information relating to selected depths.

23. The system of claim 22 wherein the navigable mechanism is further configured or designed to automatically scroll through the display in a manner which causes additional depth specific sonic logging information to be automatically displayed.

* * * * *